(12) United States Patent
Josephson et al.

(10) Patent No.: US 7,437,343 B1
(45) Date of Patent: Oct. 14, 2008

(54) MULTI-CRITERIAL DECISION MAKING SYSTEM AND METHOD

(75) Inventors: John R. Josephson, Worthington, OH (US); Balakrishnan Chandrasekaran, Columbus, OH (US); Mark Carroll, Columbus, OH (US); Naresh Sundaram Iyer, Columbus, OH (US)

(73) Assignee: The Ohio State University Research Foundation, Columbus, OH (US)

( * ) Notice: Subject to any disclaimer, the term of this patent is extended or adjusted under 35 U.S.C. 154(b) by 129 days.

(21) Appl. No.: 11/553,126

(22) Filed: Oct. 26, 2006

Related U.S. Application Data

(63) Continuation of application No. 09/717,332, filed on Nov. 20, 2000, now Pat. No. 7,155,423, which is a continuation-in-part of application No. 09/652,412, filed on Aug. 31, 2000, now abandoned, which is a continuation-in-part of application No. 09/360,828, filed on Jul. 23, 1999, now Pat. No. 6,771,293.

(60) Provisional application No. 60/093,998, filed on Jul. 24, 1998.

(51) Int. Cl.
*G06F 17/00* (2006.01)
*G06N 5/04* (2006.01)

(52) U.S. Cl. .............................. 706/60; 706/11; 706/47

(58) Field of Classification Search ................. 706/60, 706/11, 47; 707/100
See application file for complete search history.

(56) References Cited

U.S. PATENT DOCUMENTS

| | | | | |
|---|---|---|---|---|
| 5,159,647 A | * | 10/1992 | Burt | ............................ 382/103 |
| 5,373,456 A | * | 12/1994 | Ferkinhoff et al. | ............. 703/2 |
| 5,581,634 A | | 12/1996 | Heide | |
| 5,701,400 A | * | 12/1997 | Amado | ......................... 706/45 |
| 5,732,200 A | | 3/1998 | Becker et al. | |
| 5,841,437 A | | 11/1998 | Fishkin et al. | |
| 6,122,572 A | * | 9/2000 | Yavnai | ........................ 701/23 |
| 6,222,535 B1 | | 4/2001 | Hurd, II | |
| 6,278,464 B1 | | 8/2001 | Kohavi et al. | |
| 6,983,227 B1 | * | 1/2006 | Thalhammer-Reyero | ........ 703/2 |
| 2001/0003099 A1 | * | 6/2001 | Von Kohorn | ................ 463/40 |
| 2001/0014868 A1 | * | 8/2001 | Herz et al. | ..................... 705/14 |

OTHER PUBLICATIONS

John R. Josephson et al., An Architecture for Exploring Large Design Spaces, Jul. 24, 1998, AAAI, 98-105.*
Proceedings of Fifteenth National Conference on Artificial Intelligence (AAAI-98 . . . (Ausgestell . . . p. 1 of 14).*

(Continued)

*Primary Examiner*—Joseph P Hirl
(74) *Attorney, Agent, or Firm*—Standley Law Group LLP

(57) ABSTRACT

An architecture is disclosed for assistance with exploration of design and other decision spaces and for making decisions. These decision spaces may be very large. The architecture consists of three main components: A Seeker acquires candidates by generating or retrieving them, along with their scores according to one or more criteria. A Filter locates a relatively small number of promising candidates that are retained for further analysis. Various filters may be used to locate the promising candidates. A Viewer allows a user to examine trade-off diagrams, and other linked displays, that present the filtered candidates for evaluation, analysis, further exploration, and narrowing the choice set. The computational load of the Seeker may be distributed among a large number of clients in a client-server computing environment.

20 Claims, 25 Drawing Sheets

OTHER PUBLICATIONS

Calpine, H. C. et al., Some Properties of Pareto-optimal Choices in Decision Problems, The Int. Jl of Mgmt Sci., vol. 4, No. 2, 1976, pp. 141-147.

Chandrasekaran, B., Diagrammatic Representation and Reasoning: Some Distinctions, AAAI Fall 97 Symposium Series, pp. 63-67.

Chandrasekaran, B., Multimodal Perceptual Representations and Design Problem Solving, Visual and Spatial Reasoning in Design: Computational and Cognitive Approaches, Jun. 15-17, 1999, pp. 51-62.

Chandrasekaran, B. et al., Representing Function as Effect, Proceedings of the Fifth International Workshop on Advances in Functional Modeling of Complex Technical Systems, Jul. 1997, pp. 39-50.

Miller, T. et al., Simulation-Based Hybrid-Electric Vehicle Design Search, Society of Automotive Engineers, Inc., 1999, pp. 80-89.

Houser, D. R. et al., A Multi-Variable Approach to Determining the "Best" Gear Design, Proceeding of DETC '2000, 2000 ASME Power Transmission and Gearing Conference, Sep. 10-13, 2000, pp. 90-97.

Josephson, J. R. et al., An Architecture for Exploring Large Design Spaces, American Association for Artificial Intelligence, www.aaai.org, 1998, pp. 98-105.

\* cited by examiner

Entity: 15gal_tank
quantities:
    volume: float
    density: float
    flow_rate: float
behaviors:
    (time = 0) => volume = 15/264 m^3
    % 15-gallon tank
    diff(volume) = – flow_rate
    density = 0.00078 kg/m^3
    % Diesel Fuel

— 160

---

Entity vw19
quantities:
    torque: float
    speed: float
    efficiency: float
    BSFC: float
behaviors:
    Tw_vw19[speed] * driver.throttle_angle
    = torque
    efficiency_vw19[torque,speed]
    = efficiency
    BSFC_map[torque,speed*30/pi]
    =BSFC    % in gram/kW–hr

— 162

---

Relation transmission_diffgear
participants:
    transmission: 5_speed_manual
    diffgear: diffgear4_6
behavior:
    transmission.torque_out =diffgear.torque_in
    transmission.speed_out =diffgear.speed_in
    % All losses from output shaft of ICE to wheel %are
    accounted for in the transmission
    % efficiency

MULTI-CRITERIAL DECISION MAKING SYSTEM AND METHOD

CROSS-REFERENCES TO RELATED APPLICATIONS

This application is a continuation of U.S. application Ser. No. 09/717,332 filed Nov. 20, 2000, now U.S. Pat. No. 7,155,423 issued Dec. 26, 2006, which is a continuation-in-part application under 37 CFR 1.53(b) of application Ser. No. 09/652,412, filed Aug. 31, 2000, now abandoned, which is a continuation-in-part application under 37 CFR 1.53(b) of U.S. application Ser. No. 09/360,828, filed Jul. 23, 1999, now U.S. Pat. No. 6,771,293 issued Aug. 3, 2004, which claims the benefit of U.S. Provisional Patent Application No. 60/093,998, filed Jul. 24, 1998, all of which are incorporated herein by reference.

This invention was made with Government support under Grant No. N00014-96-1-0701, awarded by USONR (DARPA). The Government has certain rights in this invention.

FIELD OF INVENTION

The present invention is in the field of decision-support systems and multiple criteria decision making systems. A system and method is disclosed for assistance with exploring design and other decision spaces and making choice decisions based on multiple criteria. These decision spaces may be very large.

BACKGROUND OF THE INVENTION

Present techniques for selecting among designs, and making other kinds of choices among alternatives, fail to deal very well with the fact that such problems are almost always multi-criterial. Often, improvements according to one criterion can be achieved only at a cost according to another criterion. In many instances, users are required to make mathematically convenient, but often inappropriate, assumptions. Traditional optimization approaches typically call for the user to assign an a priori weighting on the various criteria. The traditional approach to handling the multicriteriality of design generally treats the problem as one of optimizing a function composed of a weighted sum of the many criteria. However, assigning weights a priori is not the most natural thing for an engineer because the weights are nonlinear in the design space and are a function of what alternatives are available. There might not even be a need to trade-off criterion one against criterion two, depending on what is available.

Design as a practice generally involves incremental change. When a new design problem comes up, typically designs that have done well for a similar class of problems are incrementally modified. As new technologies for some of the components are introduced, potentially new possibilities open up the design space, but in practice, the impact of such innovations take a long time to filter to the design of the device or system as a whole, because changes are made incrementally.

Pareto optimality, as a kind of multiple-objective, or multiple criteria optimality has been considered extensively, and there is substantial prior art in this area. Techniques have been developed for generating some or all elements of a Pareto-optimal set, and for ordering or selecting from the Pareto-optimal set. Much of the work in the field has treated the problem of generation in the context of continuous function optimization, i.e., it has treated the domain of alternatives as being an n-dimensional continuous space. Then, the emphasis is laid on efficiently identifying the Pareto surface mathematically, or more commonly, some of the elements in the Pareto set. A common technique is to try to convert the problem into a standard function-optimization problem by asking the decision-maker for the relative importance of the criteria in the form of weights, and formulating a new criterion that is a linearly weighted combination of the original criteria. But such weights are notoriously hard to elicit from users, and in any case, decision-makers' preferences are typically not linear over the space of alternatives.

Even when the choice space is modeled as a discrete set of alternatives, the alternatives are not considered massively or exhaustively because the computational cost has been considered to be too high. Typically, techniques are proposed to generate, efficiently, a few of the Pareto-optimal elements rather than the entire set. In general, the major goal is viewed as reducing the computational load in considering alternatives. Although the use of filters has been proposed for reducing the number of alternatives, these proposals do not address the problems of errors and noise in the criteria values.

Whether or not some or all the Pareto-optimal elements are generated, there is still the problem of choosing from among them. There have indeed been a number of graphical approaches to this problem. Techniques such as value paths, bar charts, star coordinate systems, spider web charts, petal diagrams, scatterplot matrices, GRADS, harmonious houses, and Geometrical Analysis for Interactive Aid (GAIA) have been proposed. However, none of these techniques provide a mechanism for allowing the user to comparatively examine the various candidates and their interrelationships.

SUMMARY OF THE INVENTION

The present invention is a system and method for empowering users to explore and make choices in design and other decision spaces. These decision spaces may be quite large—potentially orders of magnitude larger than those supported by current practices. The ability to explore and make choices in large spaces requires advances on many fronts including in generating and evaluating many candidates, and identifying good candidates from those generated and evaluated.

With the present invention, design candidates may be composed by drawing components from a component library to generate qualitatively and quantitatively distinct candidates rapidly, under computer control, a powerful enabler for exploring large design spaces. Design candidates' behaviors can also be derived automatically using behavioral descriptions of the components in the component library, and these derived behaviors can be used as a basis for evaluating the candidates according to multiple criteria. Many computers can be used in parallel to facilitate rapid generation and evaluation of large numbers of choice candidates.

The present invention also helps a user to identify good candidates among those that are generated, both by providing powerful and efficient multi-criterial filters, and by providing a user interface especially suited to comparing alternatives, making trade-off decisions, and narrowing the choice set.

The present invention comprises an architecture for acquisition, exploration, and selection of choice candidates, which may be very large in number. The architecture comprises a Seeker, Filter, and Viewer. The component library technology may be used by the Seeker for composing and simulating candidates that are then evaluated. The component library technology supports representation of component behaviors, and supports composition of devices from components, and simulation of the behaviors of composed devices. A functional and compositional modeling language (FCML) is used to represent components for such libraries and to support automatic generation and simulation of candidates. The representation of functions is also supported by FCML. Devices and components, therefore, may be specified according to component types and functional requirements. As a result, components may be retrieved according to the specified functions as candidates for achieving functional requirements of or within designs.

The benefits and advantages of the present invention are apparent from the following descriptions of the drawings and example embodiments.

BRIEF DESCRIPTION OF THE DRAWINGS

FIG. 8 depicts representations of components in accordance with the FCML of the present invention;

DETAILED DESCRIPTION OF THE INVENTION

Figure 1:
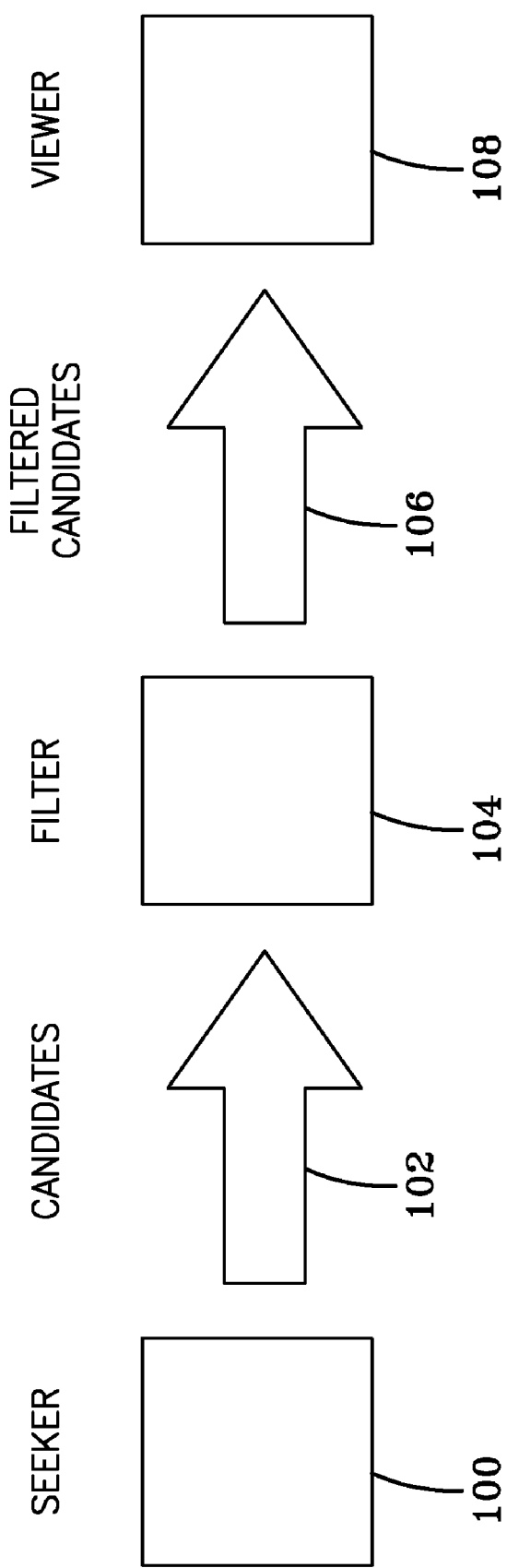
FIG. 1 is a block diagram of an architecture for an example embodiment of the present invention.

Referring to FIG. 1, a block diagram of an architecture for an example embodiment of the present invention is shown. In FIG. 1, the primary components of the example architecture are shown. The Seeker 100 acquires alternative candidates 102 by generating them or retrieving them from another source such as a database, and evaluates them according to multiple criteria. The candidates 102 might be designs for a device, plans to achieve a set of objectives, alternative hypotheses for an experiment, alternative holdings for a stock portfolio, or any set of alternatives that a user may want to consider and evaluate using multiple criteria. The FCML compositional modeling and simulation technology of the present invention may be used to generate and evaluate design candidates in many different domains. Generating the candidates and evaluating them may involve domain-specific techniques and algorithms. In some domains, a database of alternatives and their evaluations may be available and the Seeker only needs to retrieve or draw them from the database.

The evaluated candidates 102 are passed from the Seeker 100 to the Filter 104. A subset of the candidates remains after application of the Filter 104. The Filter 104 may employ any one of a number of filter algorithms to reduce the number of candidates to be considered. In an example embodiment of the present invention, a dominance filter may be used. In a classical dominance filter, design candidate A is said to dominate candidate B if A is superior or equal to B in every criterion of evaluation and strictly superior for at least one criterion. The filter removes dominated designs. Removing them does not entail any risk because a candidate is removed only when there is another candidate that is at least as good as it. Surviving designs are Pareto optimal, i.e., there is no way to improve with respect to any criterion without giving up something along another criterion.

In the event evaluations of the candidates along the various dimensions are subject to modeling error, variations on the filter may take into account any meta-knowledge about how accurate the models are. A filter may be used with a threshold, for example, $\epsilon$.

In an example embodiment, the dominance filter can be very effective. Table 1 describes the result of an experiment in the domain of hybrid electric vehicle (HEV) design, one of the domains in which the architecture of the present invention has been tested. In the final experiment, approximately 1.8 million design candidates were generated, and these were evaluated on four criteria. One thousand seventy-eight (1,078) candidates survived, giving a survivor percentage of 0.06. This filter is very effective. The user has the assurance of having examined close to 2 million design candidates in the design space, while only needing to look in some detail at about 1,000 survivors. After randomly sampling three subsets of candidates as indicated in Table 1, and running the dominance filter on them, it is clear that the percentage of survivors decreases as the number of candidates is increased. This result shows that in addition to being effective, the dominance filter scales well.

TABLE 1

| Experiment | No. of designs considered | Survivors | % Survivors |
|---|---|---|---|
| A | 1,798 | 71 | 3.95% |
| B | 17,711 | 173 | 0.98% |
| C | 179,874 | 556 | 0.31% |
| D | 1,796,025 | 1,078 | 0.06% |

Filtered candidates 106 are passed from the Filter 104 to the Viewer 108. The Viewer 108 permits the user to view trade-offs in multiple scatterplots and select subsets interactively. The different scatterplots are linked so that selections in one plot are reflected in other plots. One or more software components may be designed and implemented to conform to the Seeker-Filter-Viewer architecture.

Figure 2:
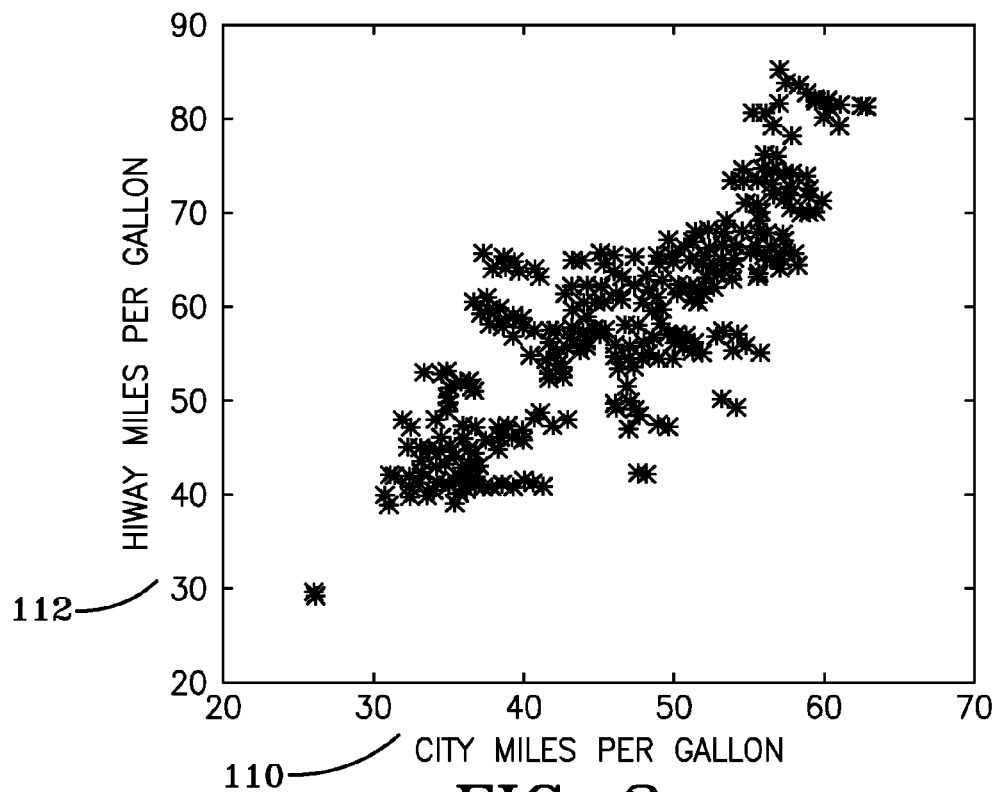
FIG. 2 is an example screen display of a scatterplot of candidates after application of a filter.

Referring to FIG. 2, an example screen display of a scatterplot of candidates after application of a filter is shown. In the HEV domain, FIG. 2 illustrates a scatterplot or trade-off diagram of candidates that survived the Filter and are displayed by the Viewer, showing trade-offs between city and highway efficiencies. FIG. 2 is a scatterplot of the 1,078 survivors in the experiment in the HEV domain. The x-axis 110 is the criterion labeled "city miles per gallon" while the y-axis 112 is "highway miles per gallon." These are measures of efficiency in city and highway driving, with the electric power consumption converted to its equivalent gasoline power for standardizing the comparisons. A user viewing the screen displays can see that the two efficiencies are positively correlated, as one would expect, and can see some candidates that do better in one or another dimension.

Figure 3:
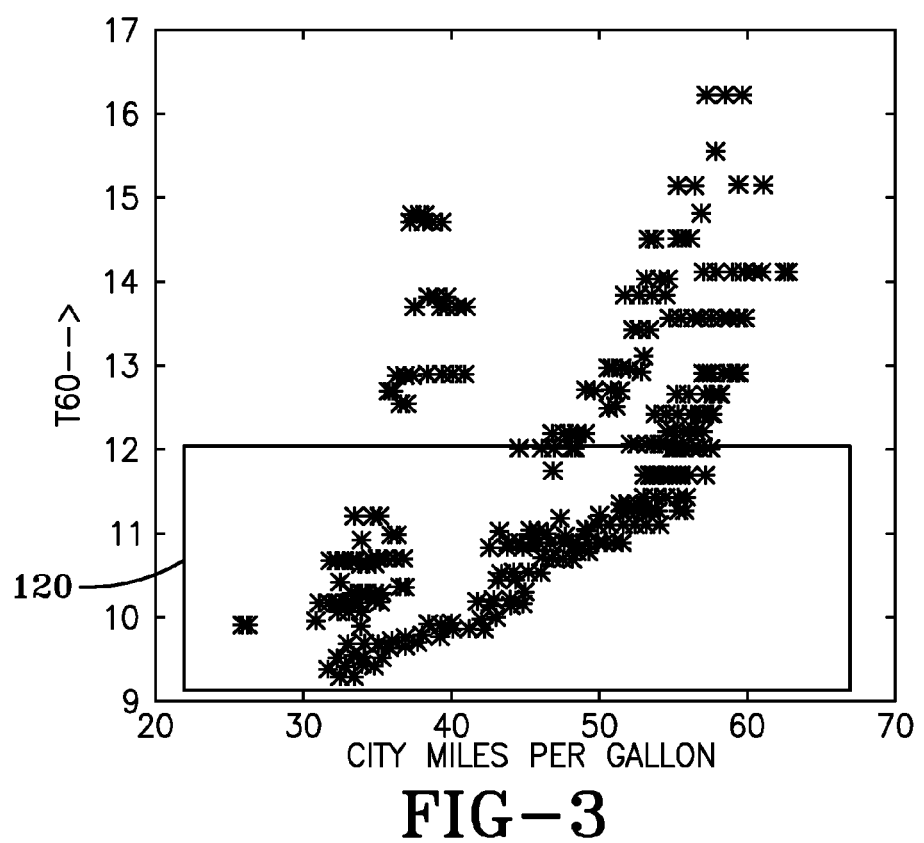
FIG. 3 is an example screen display of a scatterplot of candidates for which a user has selected a subset of the candidates.
Figure 4A:
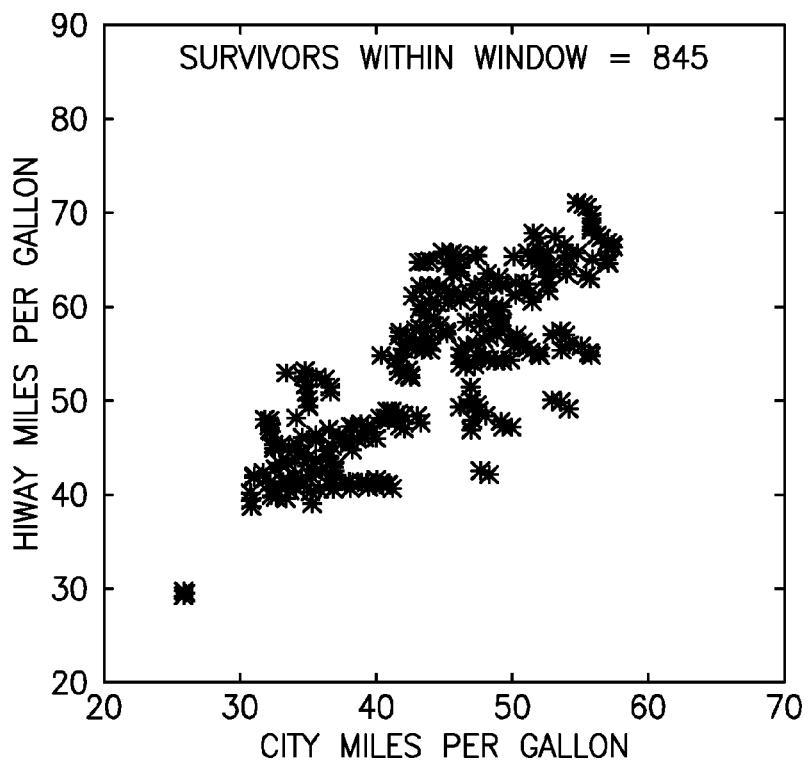
FIGS. 4A-4F is an example screen display of multiple scatterplots illustrating the display linking feature of the present invention.
Figure 4B:
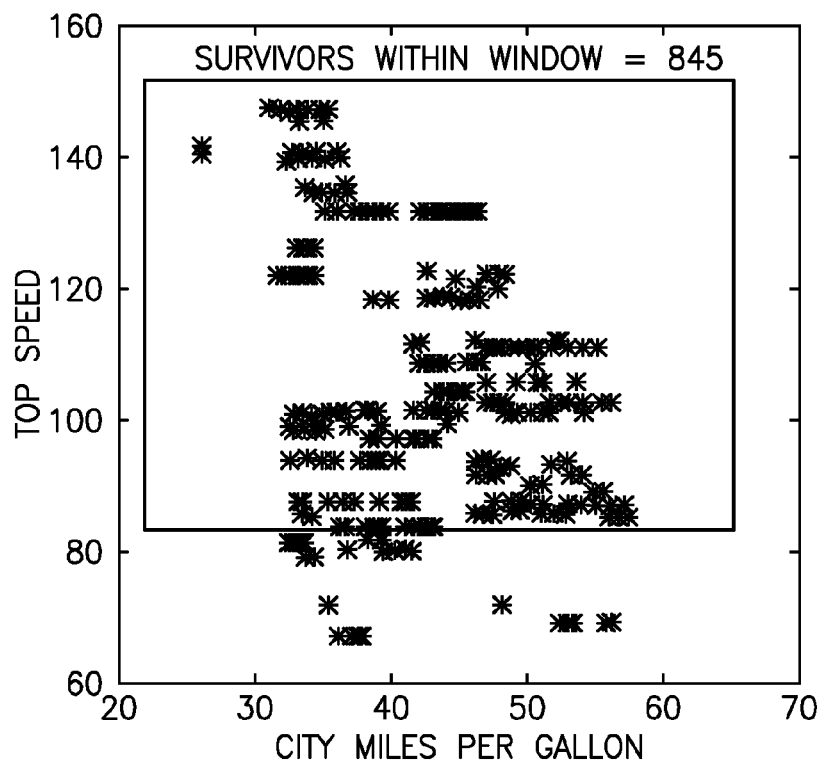
Figure 4C:
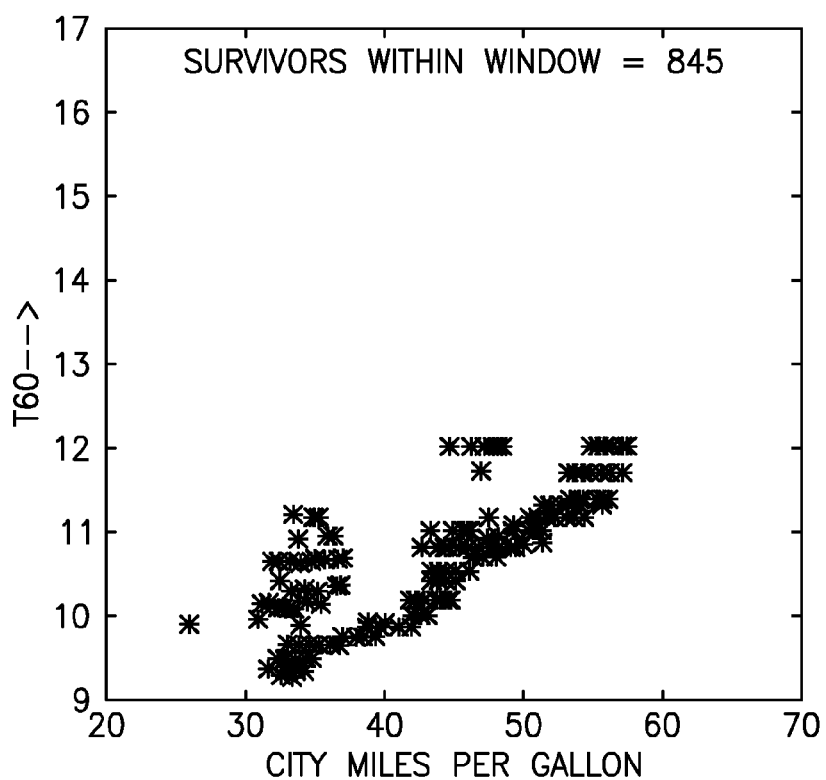
Figure 4D:
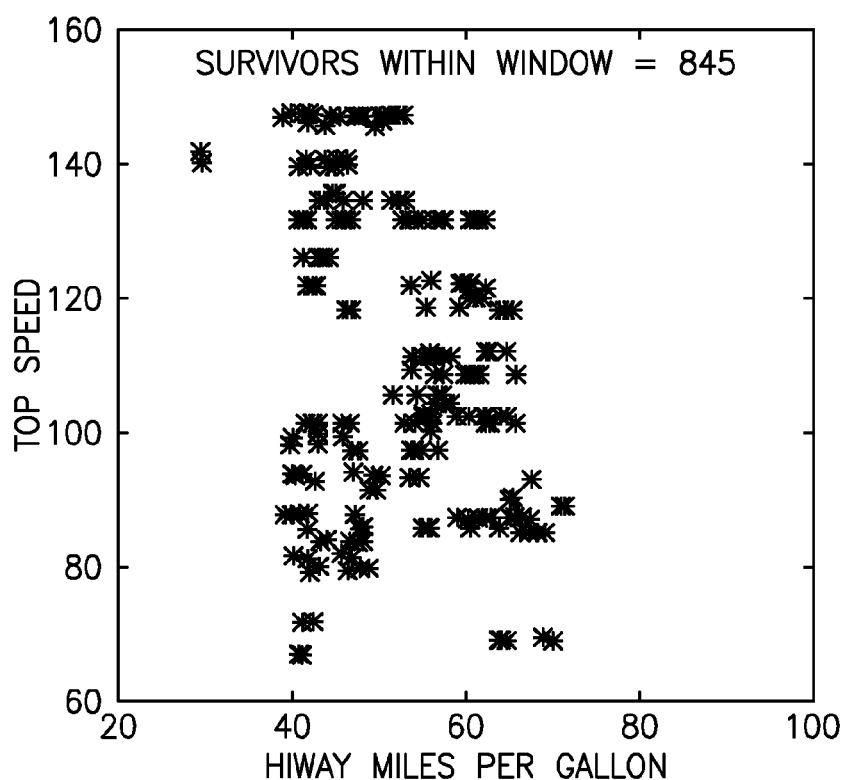
Figure 4E:
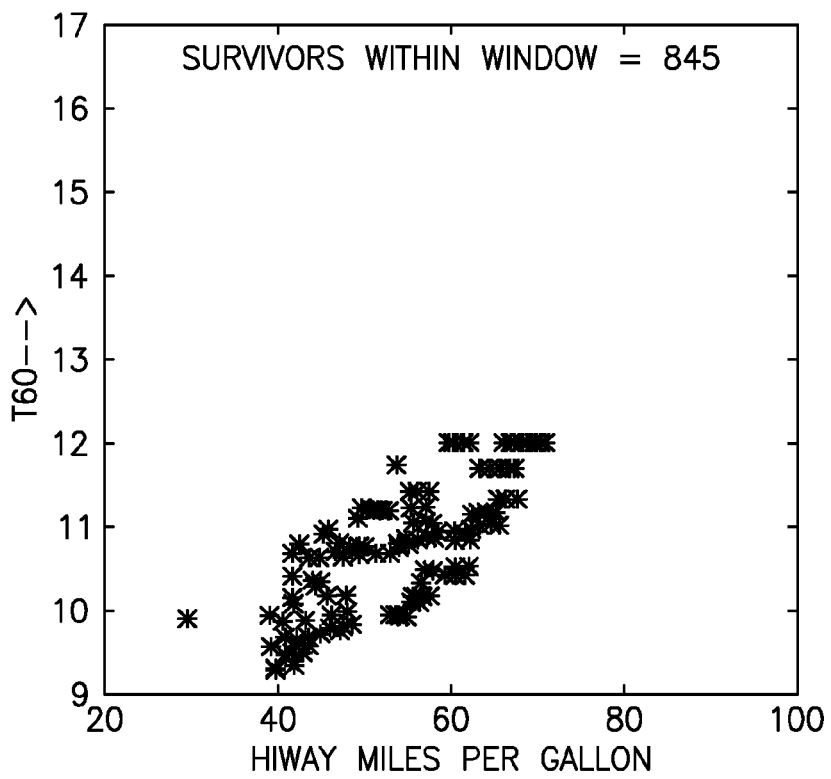
Figure 4F:
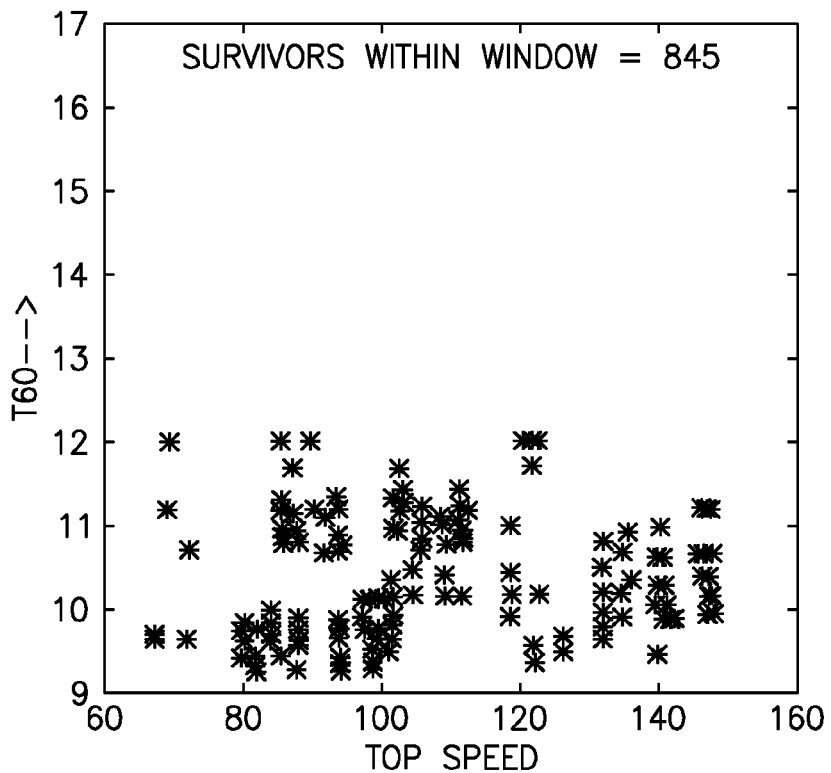

Referring to FIG. 3, an example screen display of a scatterplot of candidates for which a user has selected a subset of candidates is shown. In FIG. 3, the user sees that there are many cars that have time-to-60 MPH values better than 12 seconds. The user may discard all the candidates that perform worse than 12 seconds by selecting the candidates that perform at better than 12 seconds 120 and choosing to "zoom" or narrow the set of candidates under examination. If the user had not found that there were many candidates above this threshold, he might have had to compromise on this criterion and accept cars that are slower. This preference expression on his part comes out after the actual distribution of candidates is available. It would be difficult for a user to express this preference in advance of seeing the actual candidates.

Referring to FIGS. 4A-4F, a series of example screen displays of scatterplots illustrating the display linking feature of the present invention is shown. When the total number of criteria is small, as in the experiments in the HEV domain, users may view all of the trade-off diagrams in one screen, as shown in FIGS. 4A-4F. Otherwise, they may use their domain knowledge to identify axes with potentially interesting trade-off possibilities. The six trade-off diagrams of FIGS. 4A-4F may be shown in one screen. The four criteria of interest in this domain are city miles per gallon, highway miles per gallon, top speed (in MPH), and time (in seconds) to reach 60 MPH (a measure of the acceleration capability).

Domain specialists (i.e., HEV designers) may use the viewer to select a small number of designs for further investigation as follows. The user may next look at the city MPG versus T60 (time to 60 MPH) plot, and note that there are a number of candidates with better than 12 seconds of T60. This result suggests that that it would be safe to discard a number of candidates with high values of T60. Referring again to FIG. 3, the user may select candidates for discarding by drawing a box 120 around them. If the data does not show so many good candidates, the user may be more conservative in his discarding. The user is not required to determine an a priori weighting on the various criteria as in prior art techniques. In most cases, the weighting functions are nonlinear over the design space, and very much a function of what is actually available.

In accordance with an embodiment of the present invention, selections made in one trade-off plot are instantly reflected in all the plots. FIGS. 4A-4F display the six trade-off plots, with the results of the narrowing action by the user as depicted in FIG. 3 instantly translated into all the plots of the screen displays. The Viewer automatically rescales the dimensions so that the remaining candidates occupy the full area available, providing a zooming effect. The user may see how the survivors of a selection perform. If the results are unsatisfactory, the user may retract the selection.

Figure 5:
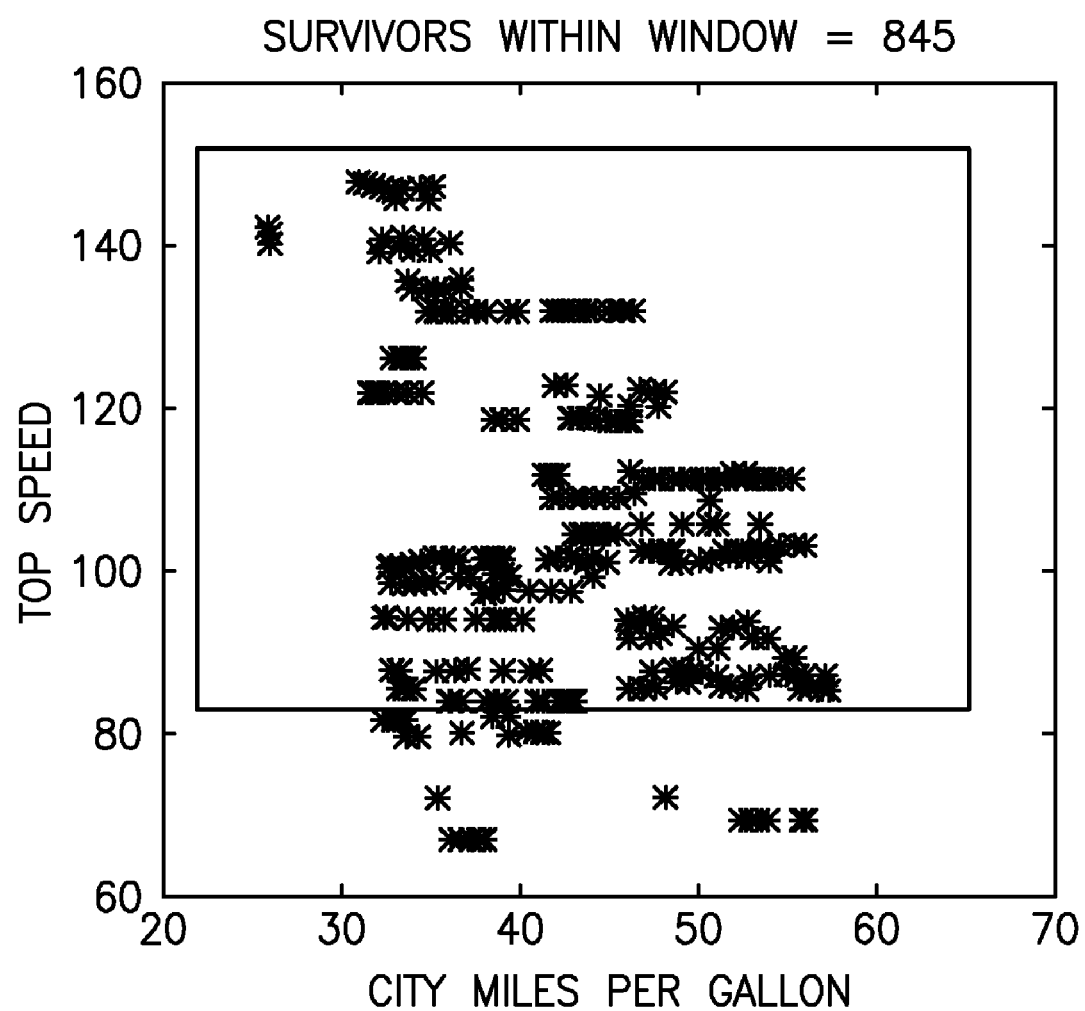
FIG. 5 is another example screen display of a scatterplot of candidates for which a user has selected a subset of the candidates.

The user may proceed similarly to look at other trade-off diagrams and make additional selections, either to discard or to keep. Referring to FIG. 5, an example screen display of a scatterplot of candidates for which a user has selected a subset of the candidates is shown. As indicated in FIG. 5, the user may next look at the city MPG versus top speed plot and select cars with a top speed of above 80 MPH. This choice was very conservative, but, with respect to top speed, the goal of the user was not to maximize it as much as to keep it acceptably high, while looking for real winners in the efficiency dimensions. The user may examine candidates based on the criterion of top speed and then look to maximizing efficiency.

Figure 6:
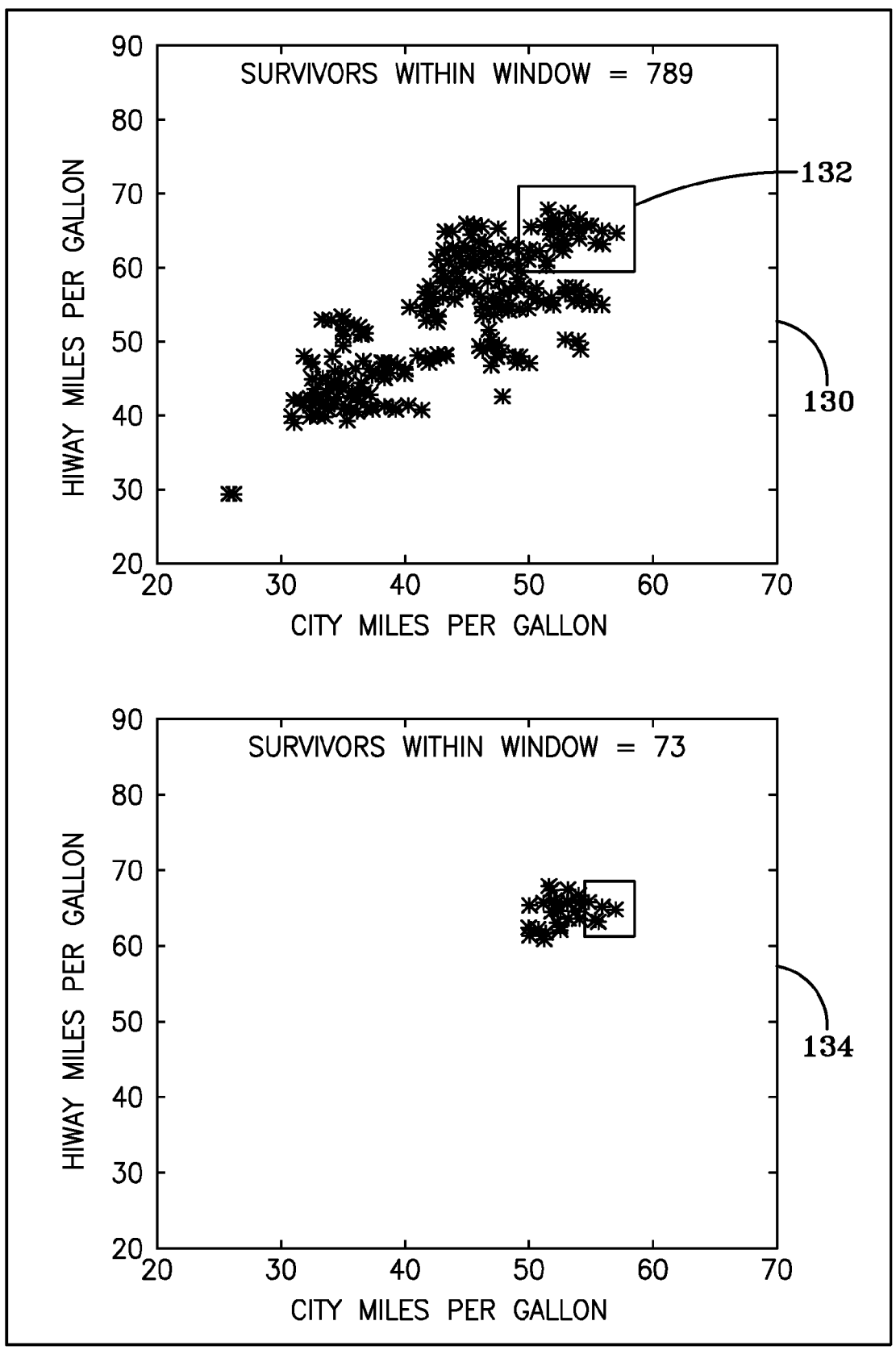
FIG. 6 is a series of example screen displays of scatterplots depicting narrowing or "zooming" selected regions.

Referring to FIG. 6, a series of example screen displays of scatterplots depicting selected regions is shown. The pair of scatterplots shows which candidates the user has selected as the best candidates as he revisits the city MPG versus highway MPG plot, now showing the results of earlier pruning. In the plot on the left 130 in FIG. 6, the user has selected candidates that appear best in both dimensions by drawing a rectangle 132 around them. Then, in the next plot 134, the user favored city efficiency somewhat and ended with 7 candidates. As one would expect, the user checked the other trade-off plots to be sure that the values of the final selected candidates in the other dimensions were satisfactory.

Types of decision activities that a user performs using the Viewer include: 1) discarding bad alternatives in some scatterplot; 2) selecting good alternatives in some scatterplot; and 3) looking for regions in a scatterplot where, for a relatively small decrease in performance in one dimension, a disproportionately large increase is available in the other dimension. These decisions are interspersed with other activities in which the user examines, in other scatterplots, the consequences of a proposed decision in one scatterplot, and retracts or modifies an earlier decision in the original scatterplot as appropriate.

The Viewer may be used for more than trade-offs towards final selection, however. An important benefit of the Viewer is that it can give the user a deeper understanding of the decision space, by enabling him to see how the criteria values and the design specifications interact. Further, additional, so-called secondary, criteria may be used to select from the candidates in the Viewer. These secondary criteria are not important enough to be used in the Filter, but may be useful to choose from among the survivors that are in some sense equivalent with respect to the criteria used in the Filter.

The technology of the present invention has been applied to several design domains, two are described here: the design of hybrid electric vehicles (HEV), as described earlier, and the design of high-performance two-gear trains. In the case of the HEV domain, as mentioned, the design space was sampled by looking at about 1.8 million candidates. In the gear design experiment, approximately 80,000 candidates were generated. In both of these domains, the candidates that were finally selected, in many respects, would not be considered major surprises. However, in both cases, the users appreciated the assurance that they received from the experiment that there were no overlooked elements in the design space. This assurance seems to be as valuable to users as the prospect of finding candidates that are distinctly superior to what they might have found without the support of the architecture. In competitive environments, this assurance is tantamount to the assurance that no competitor is likely to surprise them with a better design.

The traditional approach to handling the multicriteriality of design generally treats the problem as one of optimizing a function composed of a weighted sum of the many criteria. As mentioned earlier, assigning weights a priori is not the most natural thing for an engineer, because the weights are nonlinear in the design space and are a function of what is available. Knowing that at least twenty candidates with a top speed of above 60 MPH are available leads to different weighting behavior by a user than if he saw only two candidates that can exceed 60 MPH.

The architecture provides an appealing division of responsibility between the human and the machine. The user's preferences are expressed in two stages. At the first stage, he identifies the criteria that matter to him, and the computer applies this preference to pare the set of decision alternatives or candidates. Then, the user brings additional preferences during his interaction with the viewer to make a selection from this reduced set. The preferences that he brings to decision-making are typically of the sort that would be hard to state abstractly and precisely enough for automated application.

Using the present invention, implicit preferences may become explicit and be expressed in the presence of concrete alternatives. For example, in the use of the Viewer in the HEV domain, the user may decide on a cut-off for top speed, but the cut-off is based on being presented with the concrete set of candidates. Basically, his reasoning is something like the following: "Now that I see that there are about 845 candidates with top speed above 80 MPH, I can get rid of those that don't come up to this level of performance." This preference may be implicit in the mind of the user before the Filter stage, but becomes explicit in the context of the specific distribution. Although it may be possible in principle to discern the user's preference before the Filter stage by proposing every possible scenario of the distribution and the number of surviving candidates, this would typically be impractical.

The present invention additionally allows a user to apply secondary criteria to narrow choices even further. As mentioned previously, in many decision problems, criteria can often be divided into primary and secondary criteria. For example, in buying cars, color matters, but few individuals would use color as a criterion to filter out alternatives during the first round of decision-making, where cost, capacity, safety ratings, etc. would more likely play a central role. Once the choices have been narrowed down to a few cars, however, the availability of an especially attractive color might sway a person in the direction of one car over another in the final list. In design (and other decision problems as well), secondary criteria may be used to narrow choices in the Viewer stage. The Viewer enables the user to access, for selected candidates, information in addition to the performance on the criteria that were used as the basis for filtering.

Referring again to FIG. 1, the Seeker 100 is the component of the architecture that is responsible for acquiring the candidates (by generating them or locating them from another source) and evaluating them along the various performance dimensions of interest. These activities may be largely domain- or application-specific. In many applications the candidates, or the candidates and their evaluations, may simply be available from some source, and the Seeker only needs to acquire these candidates from the source and score them, or acquire the candidates and their already-established scores.

Several issues regarding the Seeker 100 apply to more than one domain, though not perhaps to all domains. The first issue is managing a big search when the decision space is very large, of the order of thousands or even millions of candidates. The second issue is domain-independent techniques for generating and evaluating candidates; in particular, compositional approaches to acquiring and evaluating design candidates.

It is by no means necessary to have a large decision space for the architecture of the present invention to be useful. Even when the number of alternatives is small, the Filter-Viewer combination may be very useful to reduce the alternatives to an even smaller number. In some cases, the viewer alone may provide significant value, by enabling the user to study the trade-offs. However, the architecture is particularly appropriate when the decision space is large. In the HEV domain experiment, for example, as mentioned, 2,152,698 candidates were generated, out of which 1,796,025 were fully evaluated along the four performance dimensions. (The others were rejected for violating the maximum weight restriction, even before they were fully specified.) Thus, approximately 8 million simulations were performed, one for evaluating each candidate in each performance dimension. (For some types of vehicles, city driving efficiency was evaluated by simulating twice, once starting with a full charge and once starting with the batteries partially depleted, and the results were averaged to determine the efficiency estimate, so somewhat more than 8 million simulations were actually performed.) In order to handle this amount of computation, a distributed computing environment comprising approximately two hundred workstations was exploited. The Seeker 100 used idle time on 209 workstations to search the space in 6.8 days (wall-clock time). The maximum number of workstations running at any one time was 159. The workstations were used unobtrusively—whenever anyone logged in, the process terminated invisibly.

In many design domains, candidates may be generated by composing components from a component library according to one or more design schemes, and varying the component parameters qualitatively and quantitatively. In fact, the candidates in the HEV experiments described here were generated in this way. (In the gear train domain, the component parameters were varied over their ranges.) This method of generating candidates may be called compositional generation.

Figure 7:
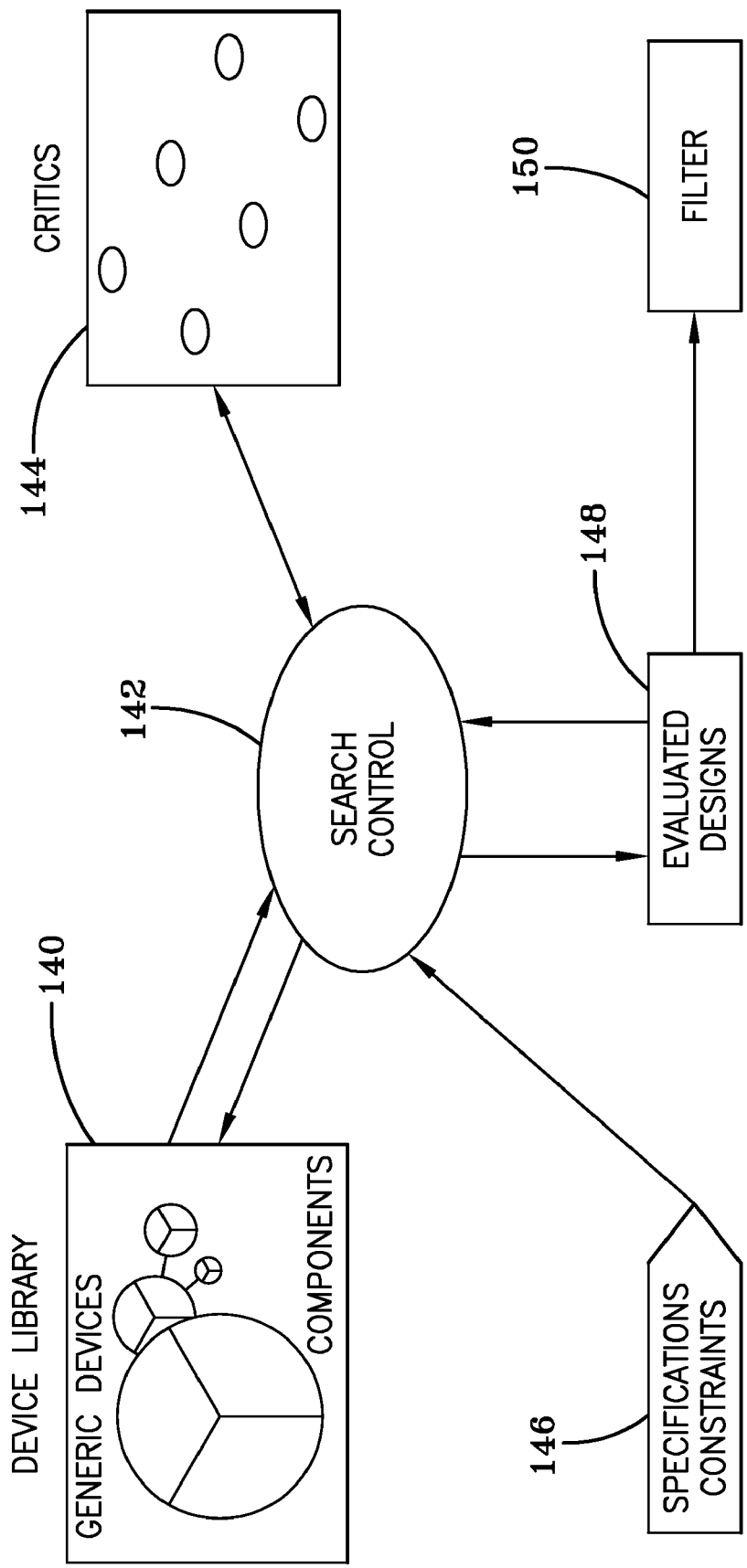
FIG. 7 is a block diagram of the use of a device library architecture for an example embodiment of the present invention.

Referring to FIG. 7, a block diagram of a device library architecture for an example embodiment of the present invention is shown. The general architecture comprises a device library 140 containing components, allowable ways of composing them, generic devices (schemas or templates specifying component types and relations and using which specific designs are determined by choosing specific components and parameter values), and their behavioral descriptions. Search control 142 embodies strategies for generation by composition, taking into account any specifications and constraints 146, for passing on candidates to evaluators (critics) 144, getting the evaluations back, organizing them, and deciding which further designs to generate and evaluate based on evaluations so far. This search control may be relatively "stupid" (e.g., exhaustively generate all possibilities) or relatively "smart" (e.g., form generalizations about what components are conducive to high valuations and favor these components in generating further alternatives to be considered). The evaluators or critics assess each candidate from the point of view of a particular aspect of performance. The evaluated designs 148 are passed on to the Filter 150.

Components for the device library 140 may be defined in accordance with a functional compositional modeling language (FCML). FCML supports numerical simulation and equation solving and may be used to specify components, their behaviors, possible relations (such as connections) between component types and information about how participants in the relations affect each other, and composition schemes (which can be viewed as abstract or generic components). Equation solving uses heuristically guided variable value propagation. In the Functional Compositional Modeling Language (FCML), devices are composed of components which are held together by relations. With knowledge of the behavior of the components and the relations that bind them, the whole device can be simulated. A text source file is constructed, containing details of the components, relations and how they are to be composed and simulated. Once a device library 140 is specified using the FCML, then design candidates may be specified composed of components from the library, and questions about the behavior of the composed designs may be posed. An FCML simulator simulates the specified device, keeps track of the variables that are implicated in the specific question asked, and provides an answer to the question. The FCML simulator provides answers if the components and relational parameters are sufficiently well specified. The FCML simulator works easily with a combinatorial generator, and thus supports automatic generation of compositional design candidates and their simulations.

FCML may be used to represent any devices whose causal relations may be captured using arithmetic, algebraic, differential, and logical formalisms. The class of devices is broad. However, the usefulness is affected by the FCML simulator's ability to solve the (likely complex and possibly changing) system of equations that results from representing the simulation problem using the representational system of the FCML. Human problem solvers, especially in engineering and scientific domains, bring substantial knowledge of mathematics (such as algebra and differential equations) to solve complex systems of equations. If the specification of the device is complete (in the sense that all the numerical parameters have been assigned numerical values, and qualitative variables have been assigned specific symbolic values), then the equation solving is not difficult. Each step in the simulation may simply update the numerical values of the variables at the next time step. In FCML, a device to be simulated is called a deployed device, and specifying it requires specifying the device, an environment (with certain properties), and relations between the device and environment. In the HEV domain, the library of vehicle components is used to describe a particular vehicle and its deployment. The environment for a vehicle is described by specifying, for example, air (properties: pressure, density, humidity, etc.), road surface (properties: grade, surface type, etc.), and how these environmental variables relate to the device variables. For example, a relationship may specify that the properties of the air entering the vehicle's air intake are equal to those of the environmental air. Once a deployed device is specified, questions may be asked. For example, in the HEV domain, it is possible to ask about vehicle weight and its top speed.

In FCML, a basic component is an 'entity.' An entity (device or component) may contain information about other entities it has as parts. In general, entities may have any number of individually named parts, attributes and relations. They may also have behavior. Attributes encapsulate the top-level state of the entity. They may be thought of as local variables. Relations state that particular relationships hold between an entity's parts.

Behavior is specified as a set of equations that relate and constrain the entity's attributes or those of its parts. The equations are in terms of the attributes. The equations may be represented as groups, each group having conditions under which that group of equations becomes operational. This allows for the expression of behaviors that depend on the mode (state) of the entity. For example, a simple electrical switch has two modes, open and closed, and the equations describing its behavior may be specified differently for these modes.

Information about how entities behave when they are in causal relations with each other (such as being electrically connected, for example) is derivable from relations defined formally using FCML. A relation identifies participants (which are entities), the attributes of the participants that are involved in the relationship, and a set of behavioral constraint equations that capture the causal interactions. Entities and relations may be subclasses of any number of others. For any superclass S of an entity or relation X, all that is true for S is also true for X. Entities and relations may have abstractions. An abstraction of an entity is implemented by it, but may look quite different from it: they are related by the abstraction relation which itself may have attributes and behavior.

The device library 140 contains information about entities and relations as classes. A specific entity is defined by specifying certain parameters to specify a concrete instance. Similarly, a device is specified as a set of entities and relations that identifies concrete participating entities and the specific relations among them. A device is defined without reference to a specific environment. A deployed device requires the specification of a device in a specific environment. The conceptual separation of device and deployed device makes it possible to simulate a device in different environments, and thereby determine the values of criteria that are associated with behavior in different environments, for example, the performance of a vehicle in hill climbing and its performance on level ground.

Once a deployed device is specified, questions may be asked about it. In the HEV domain, a question might be, "What is the time to 60 MPH, beginning from a stop and accelerating maximally?" In the simulation provoked by the question, the point in time at which car velocity is greater than or equal to 60 MPH, the value of the time variable is output. Questions may be answered immediately (static analysis), or using time steps (time-based simulation) advancing until there are no unanswered questions, or until the simulation time limit is exceeded.

Referring to FIG. 8, some examples of components defined in accordance with FCML are shown. The first example 160 is of a 15-gallon gas tank. The attributes of interest are the amount of fuel remaining, the flow rate, and the fuel density. Entity vw19 162 is a representation of an IC (internal combustion) engine (vw stands for Volkswagen). Relation (transmission_diffgear) describes the causal interactions between a transmission and differential gear.

FCML is especially appropriate for automatic invocation during the Seeker's evaluation phase in a design problem. In particular, the component libraries in FCML facilitate the composition of devices according to component function. The FCML simulator has an internal equation-solver built in. The FCML simulator is also innovative in the way it intelligently and adaptively treats timesteps. For instance, if a predictable half-second phenomenon starts, the timesteps drops down to half-seconds if they were previously bigger. If they are set to a maximum of 5 seconds and an 8-second phenomenon starts, the simulator drops down to 4 seconds. If floating point phenomena mean x is known at 0.999 s and it should be known again at 1.001 s, with second-sized timesteps, they may both be regarded as having the same value. FCML is also especially appropriate for use by a Seeker in problems where the choice alternatives are causal "theories" composed of hypothesis parts. Simulations can then be used to derive predicted consequences of such theories, which can be compared with observations to score the theories as to their predictive adequacy and explanatory coverage. FCML has a special form for specifying equations compositionally for use in entities and relations. This capability is used, for example, in the simulation of HEV designs for automatically adding up weights of the components of vehicles. In this case, the total weight is specified as the "add-in" of the weights of all the parts, without need to specify the weight of each part explicitly as a variable in a total-weight equation. In FCML, all of the behavior specification occurs in the definitions of entities and relations, making things modular and thus, relatively easy to understand, use, and maintain. Input script files that are provided to the FCML simulator are also very human-readable. FCML also has a construct called "abstractions" by the use of which component phenomena are abstracted to device level phenomena (such as abstracting certain voltage levels in the components as "input addend 1" at the device level for an electronic adder).

The following is an example of an FCML representation. It deals with a simulation of a perfectly insulated boiling kettle. Table 2 comprises the FCML definition. A relation and a superclass are used.

TABLE 2 baseunits gram second meter kelvin;
multipliers mega 1e6 kilo 1000 milli .001 micro 1e–6;
extramultipliers centi 0.01;
abbreviations joule kilo gram meter –2 second –2,
    watt joule second –1,
    liter 1000 centimeter 3,;
extraabbreviations pint 473 centimeter 3,;
timevar time;
safety true;
debug false;
simstart 0 second;
simend 1000 second;
maxstep 1 second;
minhistory 2 second;
simultaneity 1;
entity Kettle
  parts
    water: Body-of-Water
    heating-element: Heater TABLE 2-continued relations
    water-in-kettle : Heater-heats-Liquid(heating-element, water)
entity Body-of-Liquid
    attributes
        shc : Number joule kelvin –1 gram –1;
        temperature : Number kelvin;
        volume : Number meter 3;
        density : Number gram meter –3;
        weight : Number gram;
        thermal-capacity : Number joule kelvin –1;
    behaviour
        weight = density * volume;
        thermal-capacity = weight * shc;
entity Body-of-Water
    superclasses
        Body-of-Liquid
    behaviour
        shc = 4.1868 [joule kelvin –1 gram –1];
        density = 1 [kilo gram liter –1];
entity Heater
    attributes
        power : Number watt;
        target-temperature : Number kelvin;
        thermostat-state : String
    behaviour
        thermostat-state = 'off => power = 0 [kilo watt];
        thermostat-state = 'on => power = 2 [kilo watt];
relation Heater-heats-Liquid
    participants
        heater : Heater
        liquid : Body-of-Liquid
    behaviour
        liquid.temperature < heater.target-temperature
            => heater.thermostat-state = 'on;
        liquid.temperature >= heater.target-temperature
            => heater.thermostat-state = 'off;
        diff liquid.temperature {time + 1 [second]} =
            heater.power/liquid thermal-capacity;
entity Deployed-Kettle
    parts
        kettle : Kettle
    behaviour
        kettle.water.temperature {0 [second]} = 300 [kelvin];
        kettle.heating-element.target-temperature = 370 [kelvin];
        kettle.water.volume = 2 [pint];
simulate Deployed-Kettle;
questions
    trigger kettle.heating-element.thermostat-state = 'off;
    time-to-reach-temperature : time;
The result is,
answered questions:
    time-to-reach-temperature:
        time = 139 [second], sample = 139 [second]

Entities may comprise composable equations. Composable operators may be used as follows. Basically, a composable operator x|O y expands into x plus any number of O y's. For instance, addition and subtraction are shown in the example in Table 3.

TABLE 3 baseunits second;
timevar time;
safety true;
debug false;
simstart 0 second;
simend 0 second;
maxstep 1 second;
minhistory 2 second;
simultaneity 1;
simulate TestEntity;
entity TestEntity TABLE 3-continued

```
    parts
        asd : SecondaryBit
        das : SecondaryBit
        ads : SecondaryBit
    attributes
        wt : Number;
        twt : Number;
    behaviour
        wt = 5;
        twt = (11 |+ wt) |− das.wt;
entity SecondaryBit
    parts
        fd : LastBit
        df : LastBit
    attributes
        wt : Number;
    behaviour
        wt = 7;
entity LastBit
    attributes
        wt : Number;
    behaviour
        wt = 9;
    questions
        total_weight : twt;
```

In an entity, |O attribute-name expands according to all attributes of that name in the entity or its parts. In Table 3, TestEntity's behaviour, $twt=(11|+wt)|-das.wt;$ expands into, $twt=11+wt+asd.wt+asd.fd.wt+asd.df.wt+das.wt+das.\\fd.wt+das.df.wt+ads.wt+ads.fd.wt+ads.df.wt-\\das.wt-das.fd.wt-das.df.wt;$ That is, $twt=11+5+7+9+9+7+9+9+7+9+9-7-9-9;$ answered questions:
total_weight:
  time=0 [second], sample=66

In a relation, a composable operator expands to allow a 'fill-in-the-blank' for the participant to which it refers. It includes all for which the other participants are related to it by the same type of relation in the same way. An example is shown in Table 4.

TABLE 4

```
baseunits second;
timevar time;
safety true;
debug false;
simstart 0 second;
simend 0 second;
maxstep 1 second;
minhistory 2 second;
simultaneity 1;
simulate System;
entity Junction
    attributes
        flow-in : Number;
    behaviour
        flow-in = 0;
entity Terminal
    attributes
        flow-out : Number;
relation Connected
    participants
        terminal : Terminal
        junction : Junction
```

TABLE 4-continued

```
    behaviour
        junction.flow-in = 0 |+ terminal.flow-out;
entity System
    parts
        junction : Junction
        terminal-1 : Terminal
        terminal-2 : Terminal
        terminal-3 : Terminal
    relations
        first-join : Connected(terminal-1, junction)
        second-join : Connected(terminal-2, junction)
        third-join : Connected(terminal-3, junction)
    behaviour
        terminal-1.flow-out = 3;
        terminal-2.flow-out = 5;
    questions
        Third-Flow : terminal-3.flow-out;
The answer is,
answered questions:
    Third-Flow:
        time = 0 [second], sample = −8
``` because the Junction entity with the Connected relation specifies that the flows have to add to 0.

Table 5 illustrates what abstractions are and how they might be used:

TABLE 5

```
baseunits Fahrenheit minute;
multipliers mega 1e6 kilo 1000 milli .001 micro 1e−6;
timevar time;
safety true;
debug false;
simstart 0 minute;
simend 60 minute;
maxstep 1 minute;
minhistory 1 minute;
simultaneity 1;
entity Room
    parts
        radiator : Heater
        atmosphere : Air
    relations
        heats : Heats__Air(radiator, atmosphere)
entity Air
    attributes
        feels : String # hot, okay, cold
entity Heater
    attributes
        persistent
            switched : String # on, off
entity Body-Of-Gas
    attributes
        current_temperature : Number Fahrenheit;
        ambient_temperature : Number Fahrenheit;
    abstraction gas : Body-Of-Gas to air : Air
    behaviour
        gas.current_temperature < 50 [Fahrenheit] => air.feels = 'cold';
        gas.current_temperature > 70 [Fahrenheit] => air.feels = 'hot;
        gas.current_temperature >= 50 [Fahrenheit] and
        gas.current_temperature <= 70 [Fahrenheit] => air.feels = 'okay;
relation Heats__Air
    participants
        heater : Heater
        atmosphere : Air
relation Heats__Gas
```

TABLE 5-continued

```
participants
    heater : Heater
    gas : Body-Of-Gas
behaviour
    heater.switched = 'on
        => diff gas.current_temperature {time + 1 [minute]} =
(80 [Fahrenheit] – gas.current_temperature)/10 [minute];
    heater.switched = 'off
        => diff gas.current_temperature {time + 1 [minute]} =
(gas.ambient_temperature – gas.current_temperature)/30 [minute];
abstraction gas-heating : Heats_Gas to air-heating : Heats_Air
entity Question
    parts
        room : Room
    behaviour
        room.atmosphere.viewed-as-Body-Of-Gas.ambient_temperature =
            30 [Fahrenheit];
        room.atmosphere.viewed-as-Body-Of-Gas.current_temperature
            {0 [minute]} =
                room.atmosphere.viewed-as-Body-Of-Gas.ambient_temperature;
        room.radiator.switched {0 [minute]} = 'on;
        room.radiator.switched {25 [minute]} = 'off;
    questions
        persistent
            How_Room_Feels : room.atmosphere.feels;
simulate Question;
```

If the abstraction from Heats_Gas to Heats_Air had an attribute x, it may be called room.atmosphere.Body-Of-Gas-abstraction.x. Given the entity Question's behaviour, an abstraction relation from a type X to a specific instance y y.X-abstraction may be named, and the abstractee is y.viewed-as-X. The result illustrates the use of persistent questions as shown in Table 6.

TABLE 6

```
answered questions:
    How_Room_Feels:
        time = 0 [minute], sample = 'cold
        time = 1 [minute], sample = 'cold
        time = 2 [minute], sample = 'cold
        time = 3 [minute], sample = 'cold
        time = 4 [minute], sample = 'cold
        time = 5 [minute], sample = 'okay
        time = 6 [minute], sample = 'okay
        time = 7 [minute], sample = 'okay
        time = 8 [minute], sample = 'okay
        time = 9 [minute], sample = 'okay
        time = 10 [minute], sample = 'okay
        time = 11 [minute], sample = 'okay
        time = 12 [minute], sample = 'okay
        time = 13 [minute], sample = 'okay
        time = 14 [minute], sample = 'okay
        time = 15 [minute], sample = 'okay
        time = 16 [minute], sample = 'hot
        time = 17 [minute], sample = 'hot
        time = 18 [minute], sample = 'hot
        time = 19 [minute], sample = 'hot
        time = 20 [minute], sample = 'hot
        time = 21 [minute], sample = 'hot
        time = 22 [minute], sample = 'hot
        time = 23 [minute], sample = 'hot
        time = 24 [minute], sample = 'hot
        time = 25 [minute], sample = 'hot
        time = 26 [minute], sample = 'hot
        time = 27 [minute], sample = 'hot
        time = 28 [minute], sample = 'hot
        time = 29 [minute], sample = 'hot
        time = 30 [minute], sample = 'okay
        time = 31 [minute], sample = 'okay
        time = 32 [minute], sample = 'okay
        time = 33 [minute], sample = 'okay
        time = 34 [minute], sample = 'okay
        time = 35 [minute], sample = 'okay
        time = 36 [minute], sample = 'okay
```

TABLE 6-continued

```
        time = 37 [minute], sample = 'okay
        time = 38 [minute], sample = 'okay
        time = 39 [minute], sample = 'okay
        time = 40 [minute], sample = 'okay
        time = 41 [minute], sample = 'okay
        time = 42 [minute], sample = 'okay
        time = 43 [minute], sample = 'okay
        time = 44 [minute], sample = 'okay
        time = 45 [minute], sample = 'okay
        time = 46 [minute], sample = 'okay
        time = 47 [minute], sample = 'okay
        time = 48 [minute], sample = 'okay
        time = 49 [minute], sample = 'okay
        time = 50 [minute], sample = 'cold
        time = 51 [minute], sample = 'cold
        time = 52 [minute], sample = 'cold
        time = 53 [minute], sample = 'cold
        time = 54 [minute], sample = 'cold
        time = 55 [minute], sample = 'cold
        time = 56 [minute], sample = 'cold
        time = 57 [minute], sample = 'cold
        time = 58 [minute], sample = 'cold
        time = 59 [minute], sample = 'cold
        time = 60 [minute], sample = 'cold
```

Referring again to FIG. 1, an example Filter 104 is the classical dominance filter. It rejects a candidate B if there is another candidate A such that A is at least as good as B in all the dimensions of comparison, and better than B in at least one dimension. Many different types of filters may be used. The performance of a dominance Filter is a function of the number of candidates (n) and the number of criteria (m). For a given n, typically, as m increases, the filtering efficiency decreases, because the probability that a candidate beats (dominates) another candidate decreases as the number of criteria increases. On the other hand, for a fixed m, typically, as n increases, the probability that a candidate is beaten increases. Filters may be modeled to take into account model errors and user sensitivity to differences in criteria values.

A simple framework may be used to analyze how the Filter performs as a function of both n, the number of candidates, and m, the number of dimensions. An assumption is applied that the values of the criteria in any dimension lies in the closed interval [0,1], and that they are distributed uniformly in this interval. Thus, n candidates may be chosen randomly such that the values of each candidate in each of m-dimensions come from a uniform distribution in the interval [0,1]. With this assumption, the fraction of the n candidates that survive is equal to the probability that a random candidate in this set of n candidates is a survivor, or $$\int_0^1 \int_0^1 \ldots \int_0^1 [1 - (1-x_1)(1-x_2) \ldots (1-x_m)]^{n-1} \, dx_1 \, dx_2 \ldots dx_m \qquad \text{Eq. (1)}$$

Figure 9:
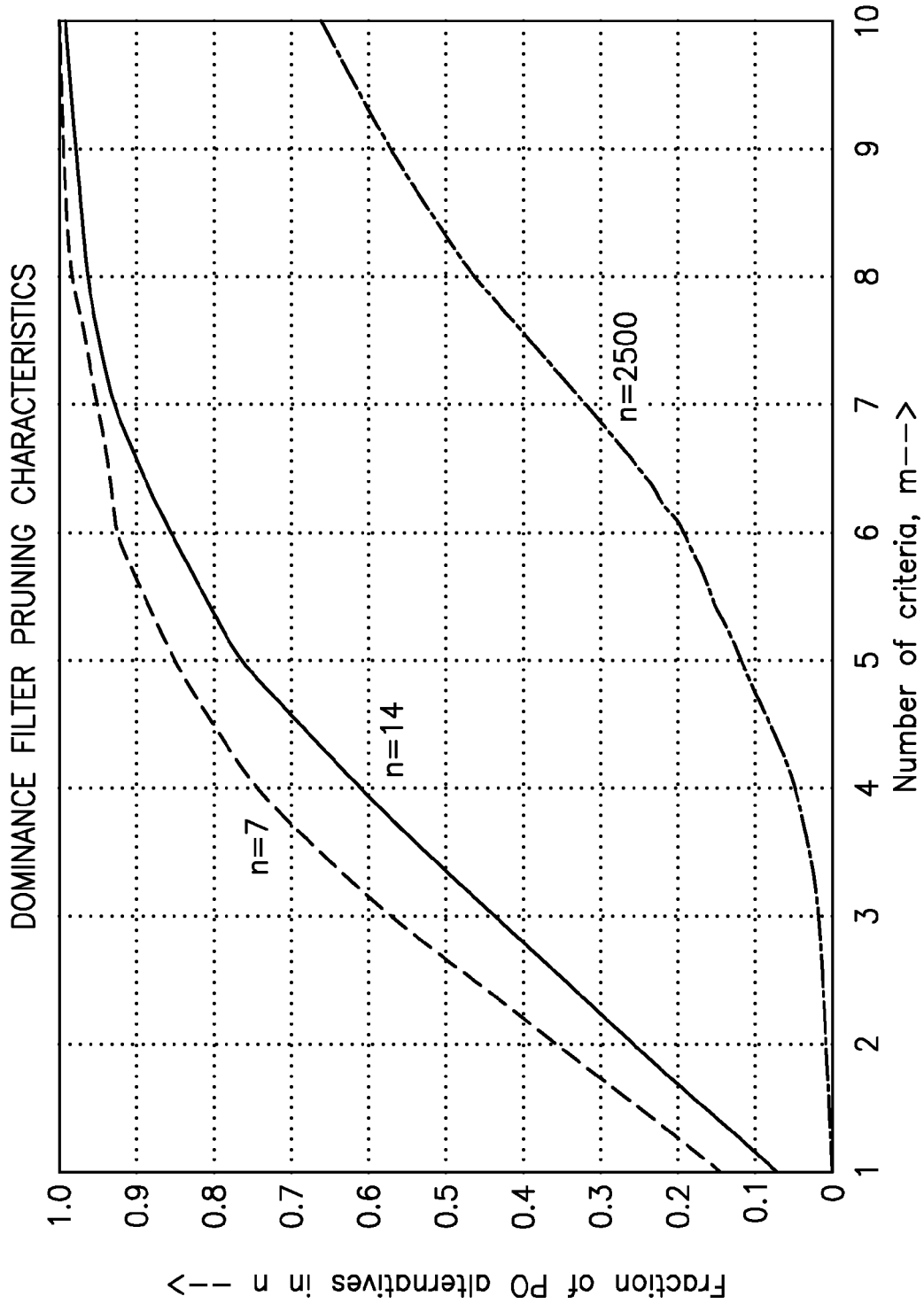
FIG. 9 is an example screen display illustrating the performance of a classical dominance filter.

As may be verified, the above integral evaluates to 0 as $n \to \infty$ for finite m, while it evaluates to 1 as $m \to \infty$ for finite n. That is, as the number of candidates increases, the probability that a candidate is a survivor decreases, while as the number of criteria increases, the probability that a candidate is a survivor increases. Referring to FIG. 9, a graph illustrating the performance of a classical dominance filter is shown.

When the dominance filter algorithm checks if one candidate is "superior or equal to" the other candidate along any criterion, it uses the values of the criteria as given. If candidate A is better than candidate B even by an extremely small amount, A is declared to be superior, and B may be discarded if it is no better than A in the other criteria. There are at least two reasons why the values as given may not be the best basis for such comparisons.

Model errors, noise, or finite measurement resolution may be present. Errors can arise in various ways. First, measurements are subject to finite precision—the values beyond a certain decimal position are not meaningful. Second, the model that is used to calculate the criterion might be incomplete or subject to uncertainties. For example, in the HEV domain, the simulation models were such that the calculation of how many miles a vehicle gets for a gallon of gasoline was deemed reliable, in the estimate of the domain specialists, within 0.5 mile. In some cases, measuring devices may add a noise component to the actual value. The net result of these errors is that the filter as described may discard a candidate when in fact it is actually not worse, and may even be better, than the candidate to which it is being compared.

Another factor to consider is user sensitivity. The user may be sensitive only to differences above a certain threshold. For example, if one dimension of comparison was cost, the decision maker may be insensitive to differences less than $10. Not taking into account this sensitivity typically results in a greater number of survivors, i.e., a reduced filtering efficiency. For example, if candidate A scores 100 and 40 in criteria $c_1$ and $c_2$ respectively and candidate B scores 99 and 50, neither one will beat the other. On the other hand, if the user sensitivity to $c_1$ is 5 units, then the two candidates are essentially equal in $c_1$, but B beats A in $c_2$.

If comparisons are made using the values as given, without taking into account the possibility of error or degree of user sensitivity, certain candidates might be discarded that should have been kept, or kept when they could safely have been discarded. In the former case, the penalty is the loss of good candidates that should have survived, and in the latter case, the penalty is having more survivors, thus increasing the complexity of decision-making during the Viewer stage.

A solution to the problem is to associate a tolerance with the comparisons. For example, candidate A may be said to be superior to candidate B in a dimension only if A's value in that criterion is better than B's value by some amount, say $\epsilon$. The parameter $\epsilon$ is a measure of the uncertainty, error, resolution, or degree of user sensitivity. A filter that takes into account a tolerance is a "toleranced dominance filter."

Assuming that the motivation for tolerancing is to account for model error, rather than user sensitivity or resolution, the following observations apply. There may be a family of toleranced dominance filters, each using the $\epsilon$ tolerance factor differently. Some of the filters are conservative, i.e., they err on the side of keeping candidates, thus increasing the number of the survivors. Some of them lack the property of transitivity: if A dominates B and B dominates C, and if the dominance relation is transitive, then A dominates C. The classical dominance criterion satisfies this property, which is very useful computationally, because a candidate that is dominated by another candidate may be discarded immediately without needing to compare it with other candidates.

Examples of some of the filters are provided. For comparison, for the original classical dominance filter, the dominance relation is $\epsilon$ is equal to 0. Therefore, candidate A dominates candidate B if A is equal to or better than B in all the criteria and strictly better than B in at least one criterion.

Another example is "strict" dominance. Candidate A is $\epsilon$-better in some criterion than alternative B if the criterion-value for A is greater than the criterion-value for B by more than $\epsilon$. In such a case, B is $\epsilon$-worse than A on that criterion. Next, alternative A $\epsilon$-dominates alternative B if A is $\epsilon$-better than B in at least one criterion and moreover A is not $\epsilon$-worse than B on any of the other criteria. The relation $\epsilon$-dominates, unlike the classical dominance relation, is not transitive. In other words, it is possible that an alternative A $\epsilon$-dominates alternative B, B $\epsilon$-dominates alternative C and it need not follow that A $\epsilon$-dominates alternative C. It is possible that either A and C tie or even that C $\epsilon$-dominates A.

Consider the three-alternative case with two criteria x and y as indicated in (e1). The tolerance values for x and y may be 1. Then, for this case, A $\epsilon$-dominates B, B $\epsilon$-dominates C, but A does not $\epsilon$-dominate C. Rather A and C are tied under the $\epsilon$-dominates relation. This result occurs because A and C are indistinguishable with respect to each other in both x and y so that neither $\epsilon$-dominates the other.

|   | x | y |      |   | x | y | z |      |
|---|---|---|------|---|---|---|---|------|
| A | 2 | 3 |      | A | 1 | 3 | 2 |      |
| B | 3 | 1 |      | B | 2 | 1 | 3 |      |
| C | 1 | 2 | (e1) | C | 3 | 2 | 1 | (e2) |

More specifically, A does not $\epsilon$-dominate C, showing that the $\epsilon$-dominates relation fails to be transitive. This weaker breakdown of transitivity may be referred to as weak intransitivity. The triplet (A, B, C) is referred to as an intransitive chain. Consider the three alternative, three criteria example indicated as (e2) with $\epsilon$ values all set to 1. In this case, A $\epsilon$-dominates B, B $\epsilon$-dominates C, and C $\epsilon$-dominates A. Because the $\epsilon$-dominates relation is antisymmetric (namely, it is impossible that two alternatives $\epsilon$-dominate each other simultaneously) the above result can be interpreted as strong intransitivity. Alternatively, it can also be argued that loops with assumption of transitivity entail a reflexive relation. However, the dominates relation may be intrinsically irreflexive, namely no alternative dominates itself. This result implies that the loops indicate a breakdown in transitivity. The triplet (A, B, C) of e2 is referred to as an intransitive loop. As a result, strong intransitivity does not occur for a case with less than three criteria.

The result of these breakdowns in transitivity is that the algorithm for dominance filtering now becomes order-dependent. In other words, it is no longer possible to discard forever any alternative that gets $\epsilon$-dominated by some single survivor S because it might later $\epsilon$-dominate another alternative which itself $\epsilon$-dominated S. Hence, the use of the previous scheme becomes potentially lossy because virtuous alternatives occurring in either a chain or a loop may be eliminated. In other words, loops or chains on the Pareto surface may lead to the elimination of Pareto alternatives. Considering the example of e2 when starting with the arbitrary pair A, B. Because A $\epsilon$-dominates B in a pairwise comparison, B is discarded and C $\epsilon$-dominates the survivor A. Hence, now A is discarded and the survivor is C. Clearly, however, A and B deserve to be survivors because B $\epsilon$-dominates the existing survivor C and A $\epsilon$-dominates B. Each of the three alternatives above lies on the measured Pareto surface and yet two of them are eliminated due to order-dependency.

Thus, there is a need to change the previous scheme or algorithm for computing all $\epsilon$-dominance survivors. One way to address the above problem is to eliminate every alternative that is beaten by some other alternative. However, this approach may result in zero survivors as evident from the example e2 where it is true that each of A, B, and C is beaten by some other alternative. Another way to resolve this issue is to allow all three to survive. The previous scheme, due to its order-dependency, allows for a subset of the alternatives occurring inside loops or chains on the Pareto surface to survive. Those alternatives occurring in such loops and chains that were eliminated may be sought, as A and B in example e2. This approach is equivalent to retaining all the survivors of $\epsilon$-dominance obtained by the order-dependent algorithm plus all those alternatives which are either not $\epsilon$-dominated by any of the existing survivors (to get the tails of the chains) or which $\epsilon$-dominate some existing survivor (to get rest of the loops and the intermediate ones in a chain).

Figure 10:
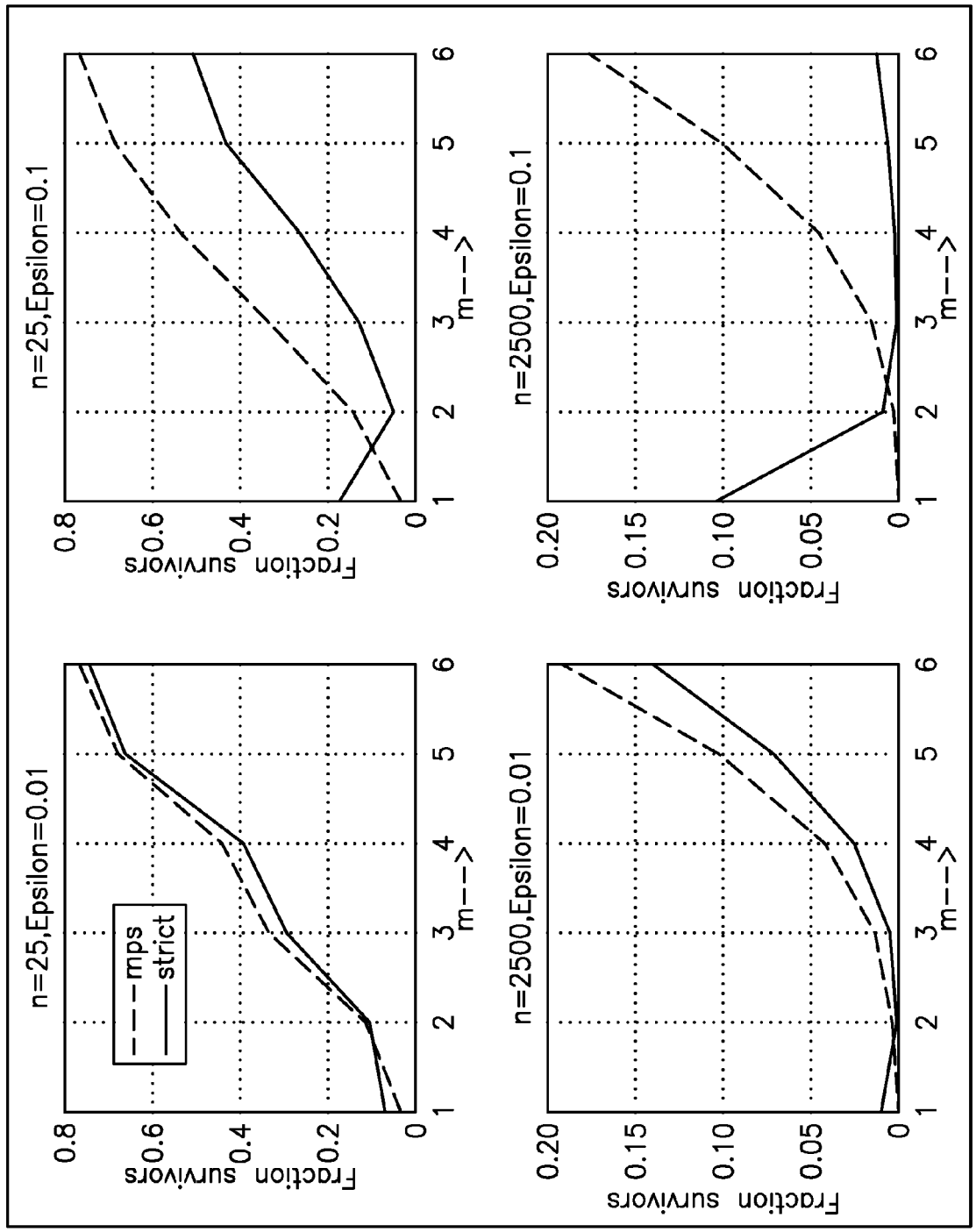
FIG. 10 is a series of example screen displays illustrating the performance of a strict filter compared to a classical dominance filter.

Referring to FIG. 10, a series of example graphs illustrating the performance of a strict ($\epsilon$-dominance) filter compared to a classical untoleranced dominance filter is shown. The graphs illustrate that the strict dominance filter sometimes pays a cost in filtering efficiency. In FIG. 10, "mps" (for "measured Pareto surface") refers to the filtering efficiency obtained if the measured values are taken as the real values (no tolerances). As $\epsilon$ increases, there is a tendency for the efficiency to decrease. For large enough values of $\epsilon$, as m, the number of criteria, increases, the efficiency increases for a while, but starts decreasing after a certain point. Two conflicting phenomena—one that tends to increase and the other that tends to decrease survivors—account for the result.

Another example filter is superstrict dominance. A super-strictly-dominates B if A is $\epsilon$-better than B in every criterion. Hence, for a given alternative to be eliminated, some other alternative must be $\epsilon$-better than it in every criterion. A filter based on this relation is conservative because indistinguishability on even a single criterion precludes a given alternative from being beaten by another alternative which may be far better than it is with regard to the rest of the criteria. Because of its conservatism, superstrict dominance does not suffer from any of the three problems which lead to lossiness in strict dominance. Its prime virtue is its losslessness, but it has relatively poor pruning efficiency.

Another example filter is the selective superstrict dominance filter. The characteristic relation for this filter is selective-superstrictly-dominates. This relation is defined with respect to a subset of the criteria being considered. Specifically, this subset contains all those criteria over which the decision-maker may want to be conservative in order to reduce the risk of losing alternatives that are good on those criteria. A selective-superstrictly-dominates B with respect to subset C of criteria if A is $\epsilon$-better than B on every criterion in the set C and moreover, A is not $\epsilon$-worse than B with respect to any of the criteria not in C. In the extreme case where C is the entire set of criteria, this filter becomes superstrict. This filter overcomes one type of lossiness of the strict filter. It also overcomes losses due to the presence of intransitive loops since the selective-superstrictly-dominates relation is weakly transitive (ARB & BRC=>~(CRA)). Thus, the losses due to the presence of intransitives are manageable because the tails of intransitive chains are lost. However, similar to strict, selective superstrict may eliminate alternatives in the measured Pareto surface and may thus be lossy. It provides a good compromise between the lossiness under cautious user insensitivities and the conservatism of superstrict.

Another filter type is DD-dominance toleranced filter. The defining relation R for this filter is DD-dominates ('DD' stands for discernible difference). Alternative A DD-dominates alternative B if A is $\epsilon$-better than B on at least one of the criteria and, moreover, A is not worse than B with respect to the rest of the criteria. Note that this relation is close in definition to the $\epsilon$-dominates relation except that the term $\epsilon$-worse is replaced by worse. The modification results in the newly defined relation becoming transitive so that the intransitives lost by $\epsilon$-dominance are retained by DD-dominance.

The rationale for this modification may be understood by looking at the example (e2) again, which contains the loop (A, B, C). Previously, it was stated that A $\epsilon$-dominates B which $\epsilon$-dominates C which $\epsilon$-dominates A. However, careful observation reveals that the criterion on which each of these alternatives beats its neighbor is different. A beats B on criterion y, B beats C on criterion z, and C beats A on criterion x. Because each pair therefore, is being effectively compared only on mutually exclusive dimensions (i.e., they are indistinguishable on the rest), there is no reason to expect transitivity. This phenomenon manifests itself in example (e2) resulting in the intransitivity of the $\epsilon$-dominates relation. If it was ensured that either all criteria play, or at least one criterion plays, an effective part in each pairwise comparison, then weak transitivity follows (no loops). The relation DD-dominates does the former—it ensures that criteria that have no effect on the pairwise comparison due to indistinguishability necessarily play a part in the fate of the pairwise comparison. Now, even if A is $\epsilon$ better than B on y, it is really worse than B on criteria x and z. Therefore, A no longer beats B so that both A and B, and by similar argument C, all survive DD-dominance.

DD-dominance retains the alternatives on the measured Pareto surface as well as some of the alternatives that could potentially have been on it. The alternatives that could potentially have been on the measured Pareto surface and that get eliminated by DD-dominance are the ones which are DD-dominated by some other DD-dominance survivor. Hence, DD-dominance treats alternatives that are indistinguishable with some MPS-survivor in all dimensions selectively—all such alternatives that are DD-dominated by some DD-dominance survivor are eliminated while those that are not DD-dominated by any other alternative are kept. However, every alternative that is indistinguishable in every dimension with respect to some alternative on the Pareto surface is virtually coincident with the Pareto-survivor and therefore, is not justifiably eliminated.

|   | x | y |   |
|---|---|---|---|
| A | 5 | 4 |   |
| B | 4 | 5 |   |
| C | 3 | 4 |   |
| D | 3 | 4.5 | (e3) |

As an example, consider the four alternative, two criteria problem as in (e3). If the tolerances on each x and y are 1, then B on the Pareto-surface is indistinguishable from both C and D on every dimension. Thus, both C and D are, within the limits of noise, coincident with B. By this virtue, neither should be eliminated. However, in this case, A (a survivor) DD-dominates C and so C is eliminated by a DD-dominance filter. However, A (or the other survivor B) does not DD-dominate D; hence D survives.

In general, the DD-dominance filter is a good compromise filter because it retains every alternative on the measured Pareto surface and is lossy only to the extent that alternatives like C in the example (e3) occur frequently and are moreover considered important.

Another example filter is the two-pass toleranced filter. This filter functions in two passes. In the first pass, it acts as the classical dominance filter and thus, obtains all alternatives that lie on the measured Pareto surface. Having done this, it now iterates over the eliminated alternatives of the first pass looking for any alternatives that lie within $\epsilon$ for every criterion of some single first-pass survivor. All such alternatives are further added to the survivor set. The two-pass filter overcomes some of the problems of strict dominance. The two-pass filter also overcomes one of the problems of DD-dominance. In the example (e3), the two-pass filter initially gathers A and B in the first pass because they each lie on the measured Pareto surface. In the next pass, the filter notices that C and D are within $\epsilon$ of B in both criteria x and y. Consequently, the filter adds C and D to the existing list of survivors. Hence, all four alternatives end up surviving, thus overcoming the problem with DD-dominance.

The properties of the filters may be summarized as follows. First, every survivor of the two-pass filter is a survivor of the superstrict dominance filter. Second, not every survivor of the superstrict dominance filter is a survivor of the two-pass filter. Thus, superstrict dominance can permit alternatives to survive that would not have survived the two-pass filter. Superstrict dominance is more conservative than two-pass. Every survivor of DD-dominance filter is a survivor of two-pass. This also implies that two-pass has a better pruning efficiency than superstrict. Finally, to summarize:

survivors(strict dominance)
$\subseteq$ survivorsDD-dominance)$\subseteq$ survivors(two-pass filter)$\subseteq$ survivors(superstrict dominance).

Another example of a filter is the onionskin filter. All of the previously described toleranced filters allow for modeling of noise associated with criteria values where there is some quantitative information available about the noise. A possible situation is one wherein it is known that the values are noisy but it is not known how the noise can be quantified. In such a case, the onionskin filter can be used. It is the classical dominance filter applied iteratively to the eliminated alternatives at hand. This process can be visualized as very similar to the peeling of the skin of an onion. The top skin represents the measured Pareto surface. Upon removal of this surface, a new top skin is visible which can itself be peeled by another application of dominance to the non-survivors to retrieve yet another layer of Pareto survivors. These layers can each be named $\{PO\}_1$, $\{PO\}_2$ and so on, where $\{PO\}_i$ is the set of alternatives obtained after i applications of dominance to the existing set of non-survivors, starting from the initial set. The depth up to which this would be carried out is directly proportional to the amount of loss the decision-maker wishes to avoid in his final set of survivors. This depth could also depend upon the user's need to have a greater number of survivors.

Other filters may be used as well. All of the filters that have been described so far, except the onionskin filter and classical dominance, model the error as deviation with a possible maximum, $\epsilon$. The goal is to try not to miss good alternatives even if the actual values are off by as much as the maximum. An alternative stance is to try to minimize the probability that good candidates are lost, and relate this probability to the probability distribution of model errors.

Analytical and experimental studies may be performed to compare the performance of many of the filters described. In an example analysis and experiment, the range of each of the criteria was set to be between 0 and 1, the values were assumed to be uniformly distributed, and $\epsilon$ was a normalized parameter, also taking values between 0 and 1. The parameter $\epsilon$ was assumed to be the same for all the criteria.

The general relations between the parameters may be summarized as follows. The pruning efficiencies of all the filters approach zero in the limit as m, the number of criteria, approaches infinity. This result is to be expected because it is unlikely that a candidate will beat another candidate in all the criteria as a larger and larger number of criteria is considered. For a given m and number of alternatives n, all of the toleranced filters—strict, superstrict, DD-dominance and two-pass filters—approach zero efficiency as $\epsilon$ approaches 1. This result again makes sense, because for $\epsilon=1$, the filter will not discard anything. For a given m and for any $\epsilon$ between 0 and 1, as n approaches infinity, different filters display different behaviors. For the classical dominance filter, i.e., the filter with $\epsilon=0$, the efficiency approaches 100% as n approaches infinity. That is, almost all the candidates will be discarded, behaving as a highly efficient filter. For strict, the efficiency approaches $(1-\epsilon^m)$. That is, all candidates, except for a fraction $\epsilon^m$, will be discarded. For superstrict, the efficiency approaches $(1-\epsilon^m)$. The efficiency of superstrict is much lower than that of strict for almost the entire range of values of $\epsilon$. For example, while for $\epsilon=0$ and 1, the efficiencies of the two coincide (for $\epsilon=0$, both have 100% efficiencies, while for $\epsilon=1$, both have 0 efficiency), for $\epsilon=0.5$, and for m=4, strict has an efficiency of about 93%, while superstrict has an efficiency of about 7%.

Figure 11:
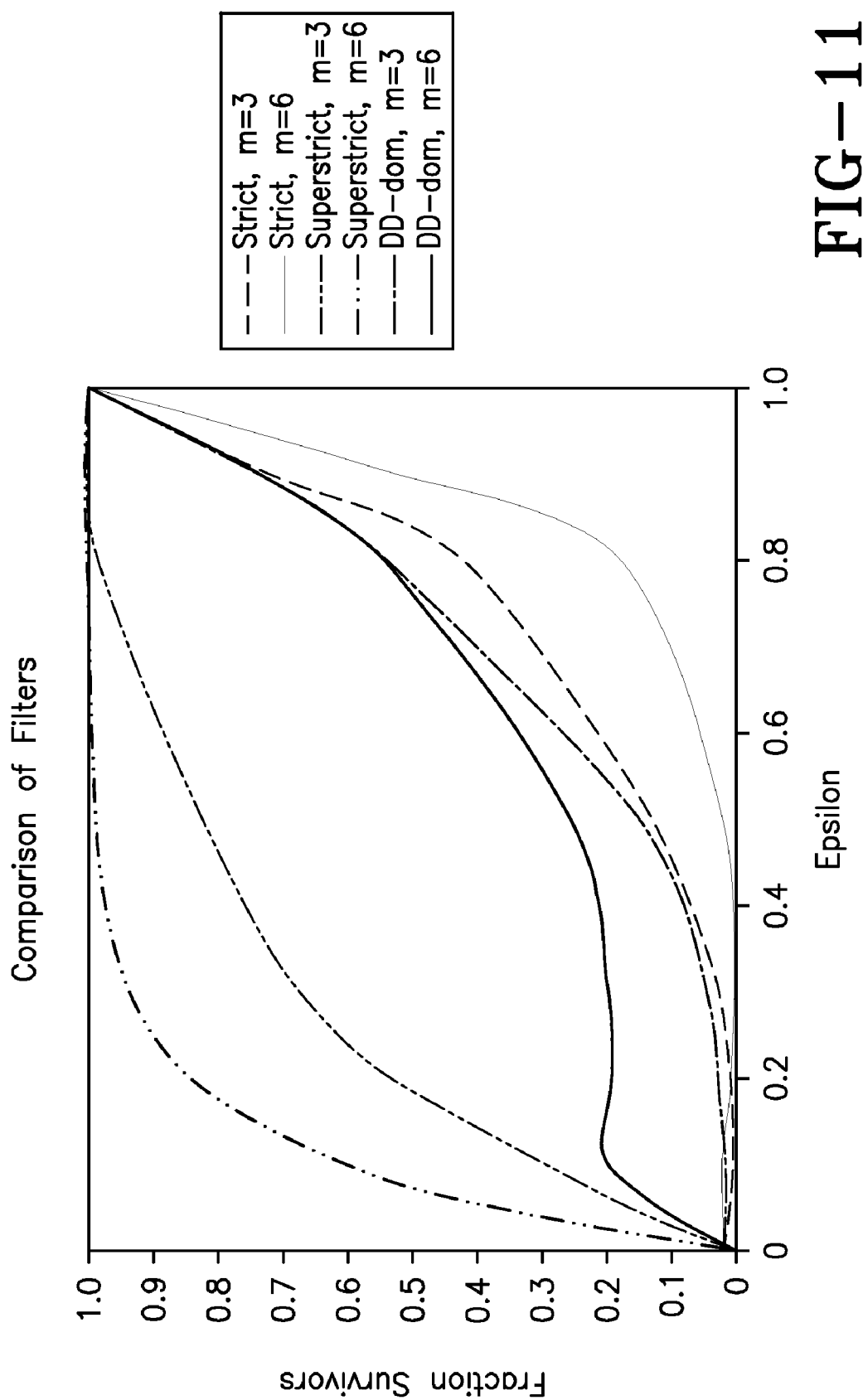
FIGS. 11 and 12 are graphs illustrating the performance of various filters.
Figure 12:
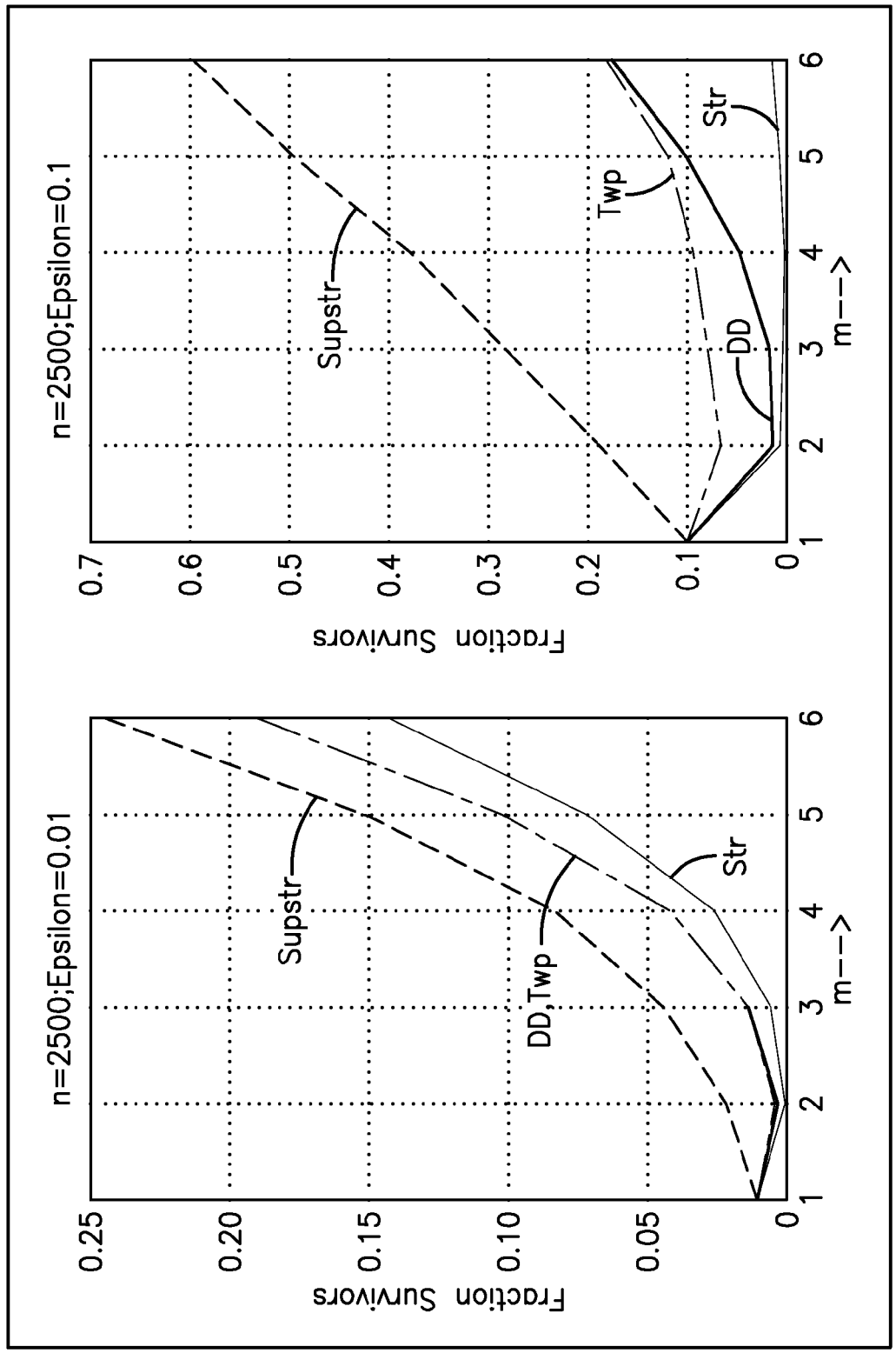

Referring to FIGS. 11 and 12, graphs illustrating the performance of various filters are shown. The graphs illustrate a comparison of the filters from slightly different perspectives. FIG. 11, which compares the pruning efficiency of strict, superstrict, and DD-dominance, shows that superstrict is the least efficient, and that strict is the most efficient of the three filters being compared. DD-dominance on the other hand has a behavior that is similar to strict. Given that DD-dominance filter avoids the intransitivity issues associated with strict, it is a good choice. Computationally, DD-dominance filter is in general slightly more costly than strict. The experiments of FIG. 11 are Monte Carlo simulations with a limited number of trials. Therefore, some of the irregular characteristics of the curves (e.g., rise-fall-rise behavior of strict for m=6 and DD-dominance for m=3) are unlikely to be meaningful. The number of candidates in these experiments was 2,500.

FIG. 12 shows two plots, for two different tolerances, of the survivor percentage for the various filters plotted against m, the number of criteria. A set of experiments was performed in which the number of candidates, the number of criteria and the values of $\epsilon$ were all varied, and for each combination, an average over a number of trials was calculated. FIG. 12 indicates that strict is efficient (the number of survivors is few). However, the efficiency is at the cost of intransitivity and related problems. The plots also corroborate that superstrict is inefficient. The plots indicate another facet of behavior that is hard to derive from limit analyses. As m increases, the efficiencies typically increase in the beginning, but then they start an upward swing, so that for large m, they all become increasingly inefficient. An interesting phenomenon that arises when $\epsilon$ is non-zero is that as m increases, the filtering efficiency often increases for a while, before decreasing. For comparison, for classical dominance, i.e., when $\epsilon$ is 0, efficiency monotonically decreases with m. Intuitively this can be understood by observing that there are two competing tendencies as $\epsilon$ is increased. On one hand, if a candidate has criterion value slightly larger than another candidate and thus might beat it, when $\epsilon$ is increased, it might not beat the second candidate by the required threshold. Thus, the second candidate is likely to survive. On the other hand, if candidate A beats candidate B by a small margin in one criterion and B beats A by a large margin in another criterion, for $\epsilon=0$, both survive. If $\epsilon$ is increased appropriately, A and B may become indistinguishable in the first criterion, while B beats A in the other criterion, thus A does not survive. This possibility tends to decrease the number of survivors.

The present invention supports exploration and decision making in large spaces. Nevertheless, there are many problems for which the number of candidates is rather small. Even in these problems, if the problem is multicriterial, human decision makers often make suboptimal decisions. The filter can help in these problems by eliminating clearly sub-optimal alternatives and by cutting down on the number of alternatives the decision maker has to examine closely. Even for small values of n, the filtering efficiency may be better than 50%.

Figure 13:
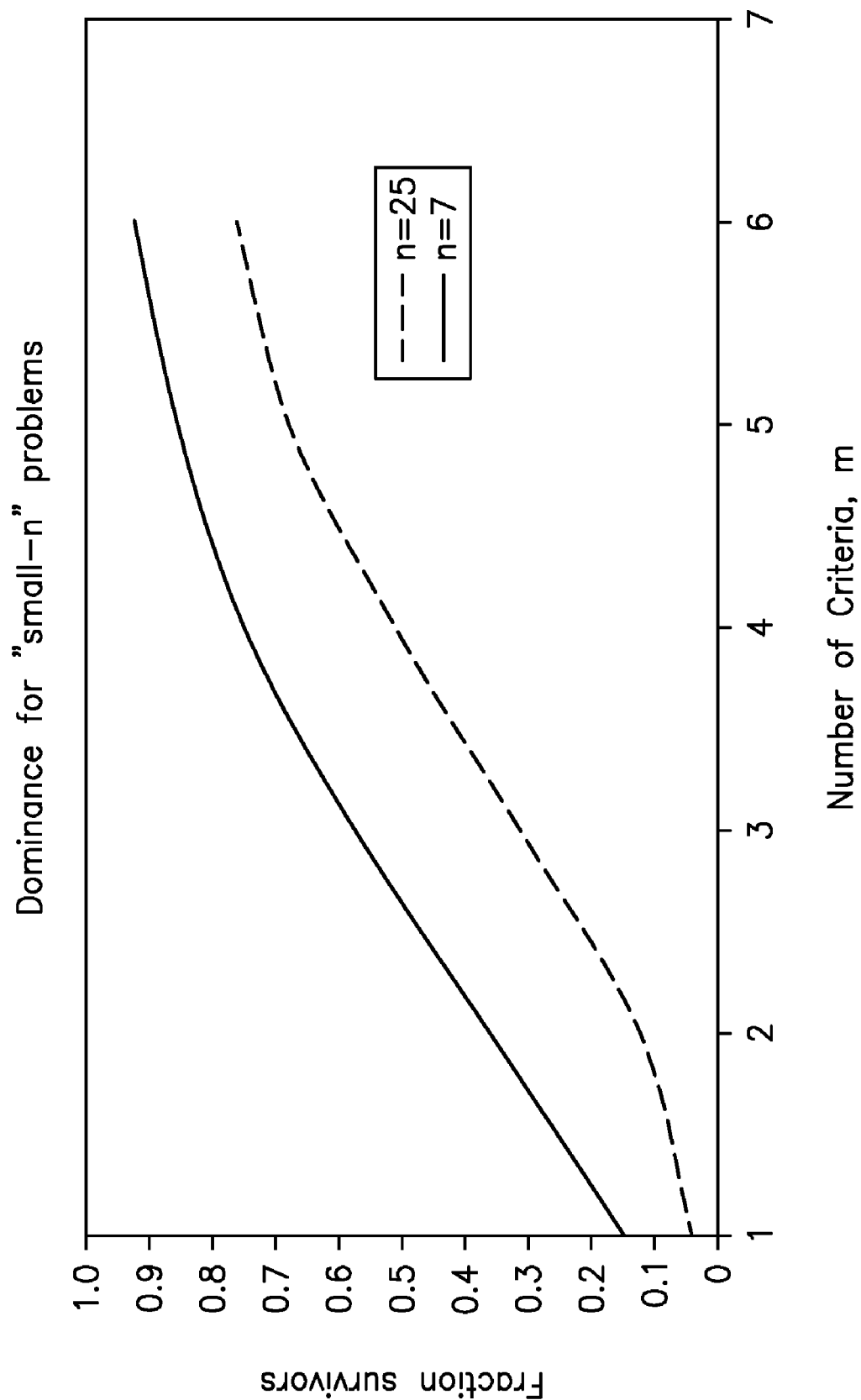
FIG. 13 is a graph illustrating the performance of a classical dominance filter for a small number of candidates.

Referring to FIG. 13, a graph illustrating the performance of a classical dominance filter for a small number of candidates is shown. For the classical, i.e., $\epsilon=0$, dominance filter, FIG. 13 shows the survivor fraction against m, the number of criteria, and for two different low values of n, the number of alternatives. Even when the number of alternatives is as low as seven and the number of criteria is as large as three, 50% efficiency may be obtained. When n=25, the same efficiency may be achieved for m as large as four.

Filtering efficiency is also high when $\epsilon$-toleranced filters are used to account for model error and user sensitivity. An experiment was conducted to answer the following question for the filters: with number of criteria ranging from 1-11 and value of $\epsilon$ ranging from 0.1-0.9, how large does n need to be (up to a maximum of 20) before at least a 50% pruning is obtained? In case some filter produces this pruning over a wide range of the m and $\epsilon$ values, such a filter would be a good filter for small n problems in general. The experiment consisted of applying the three filters to datasets that represent different triples of (n, m, $\epsilon$). Each of the datasets was generated randomly from a uniform distribution. For each such triplet, a given filter was applied to obtain a statistical guess of the expected number of survivors. More specifically, for each pair (m, $\epsilon$) considered, the value of n was incremented one at a time until it either led to a 50% pruning or n exceeded 20. At this point, n was reset and the same experiment was tried for a new (m, $\epsilon$) pair. Those (m, $\epsilon$) pairs where 50% pruning was achieved before n reached 20 are pairs for which the filter can be said to be effective for small n-problems.

Figure 14:
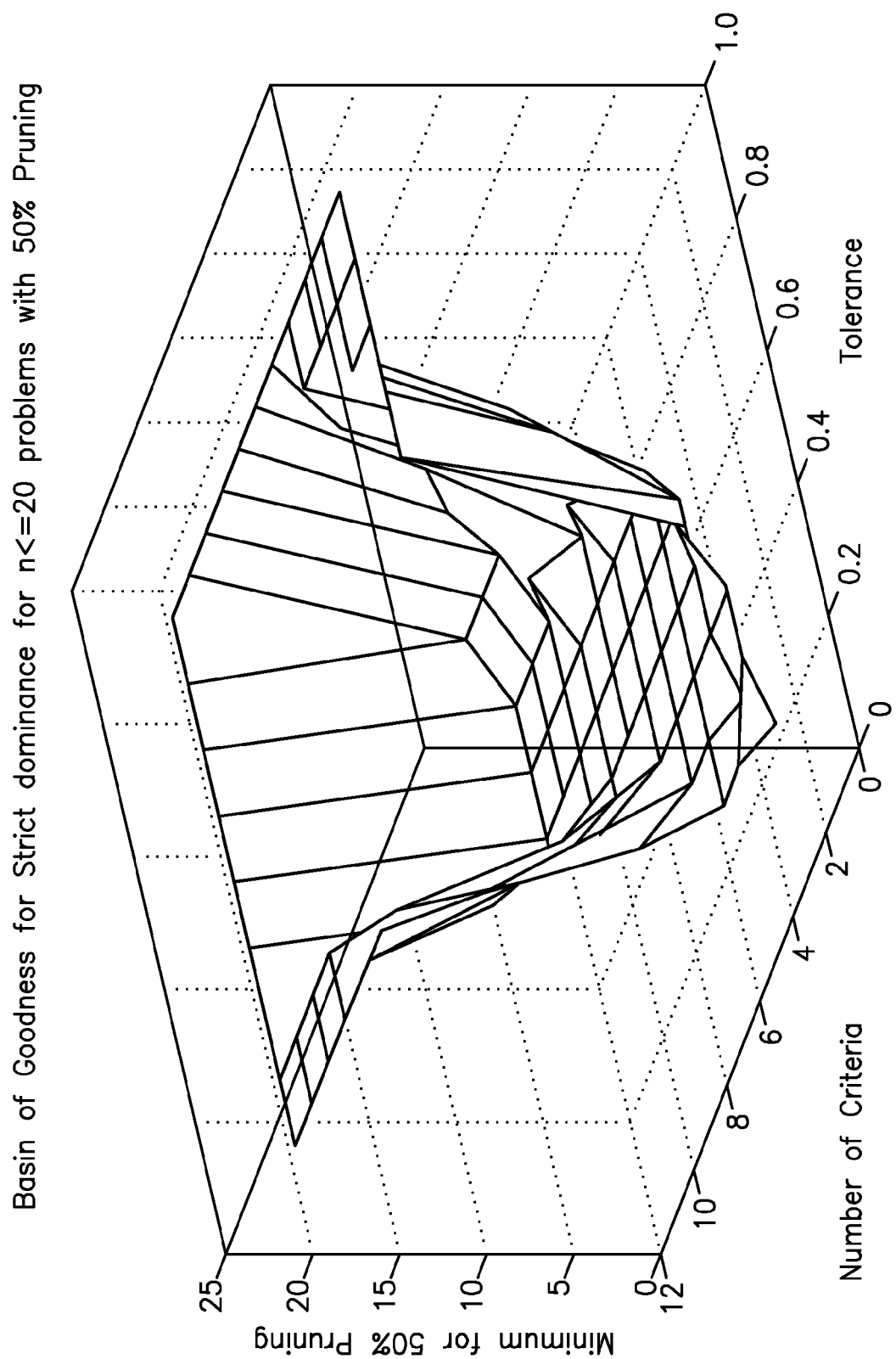
FIGS. 14 and 15 are three-dimensional plots illustrating the performance of various filters.
Figure 15:
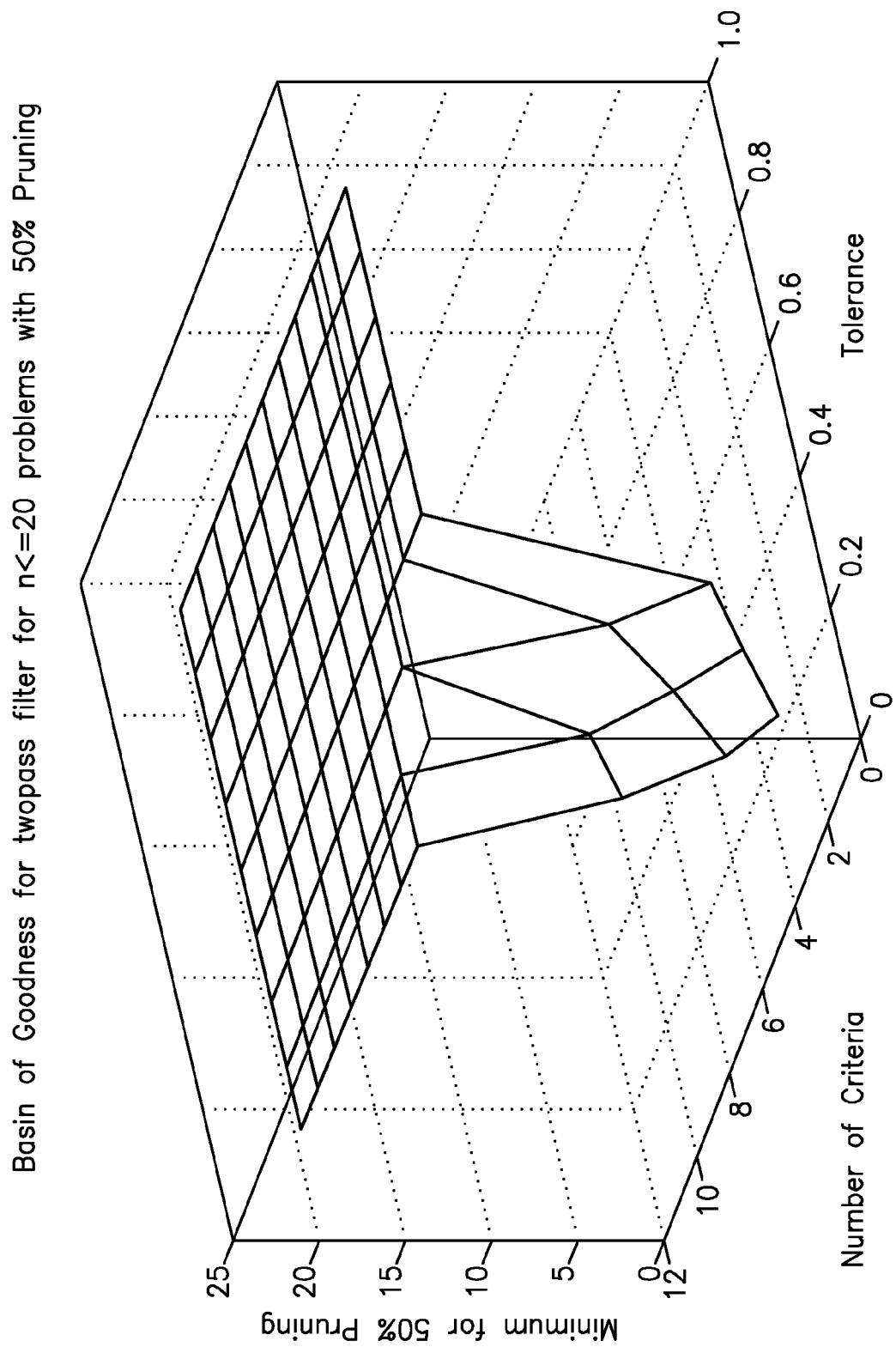

Referring to FIGS. 14 and 15, three-dimensional plots illustrating the performance of two of the filters are shown. Each three-dimensional plot shows the (m, $\epsilon$) area over which a particular filter produced 50% pruning before n exceeded 20. In FIG. 14, for strict dominance, the plot shows that there is a substantial region of values of n, the number of alternatives, m, the number of criteria, and $\epsilon$, the tolerance in the filter, for which at least 50% filtering efficiency may be achieved for low values of n. In FIG. 15, for DD-dominance the range of values of n, m, and $\epsilon$ for which filtering is at least 50% efficient is smaller than for the strict-dominance filter.

Figure 16:
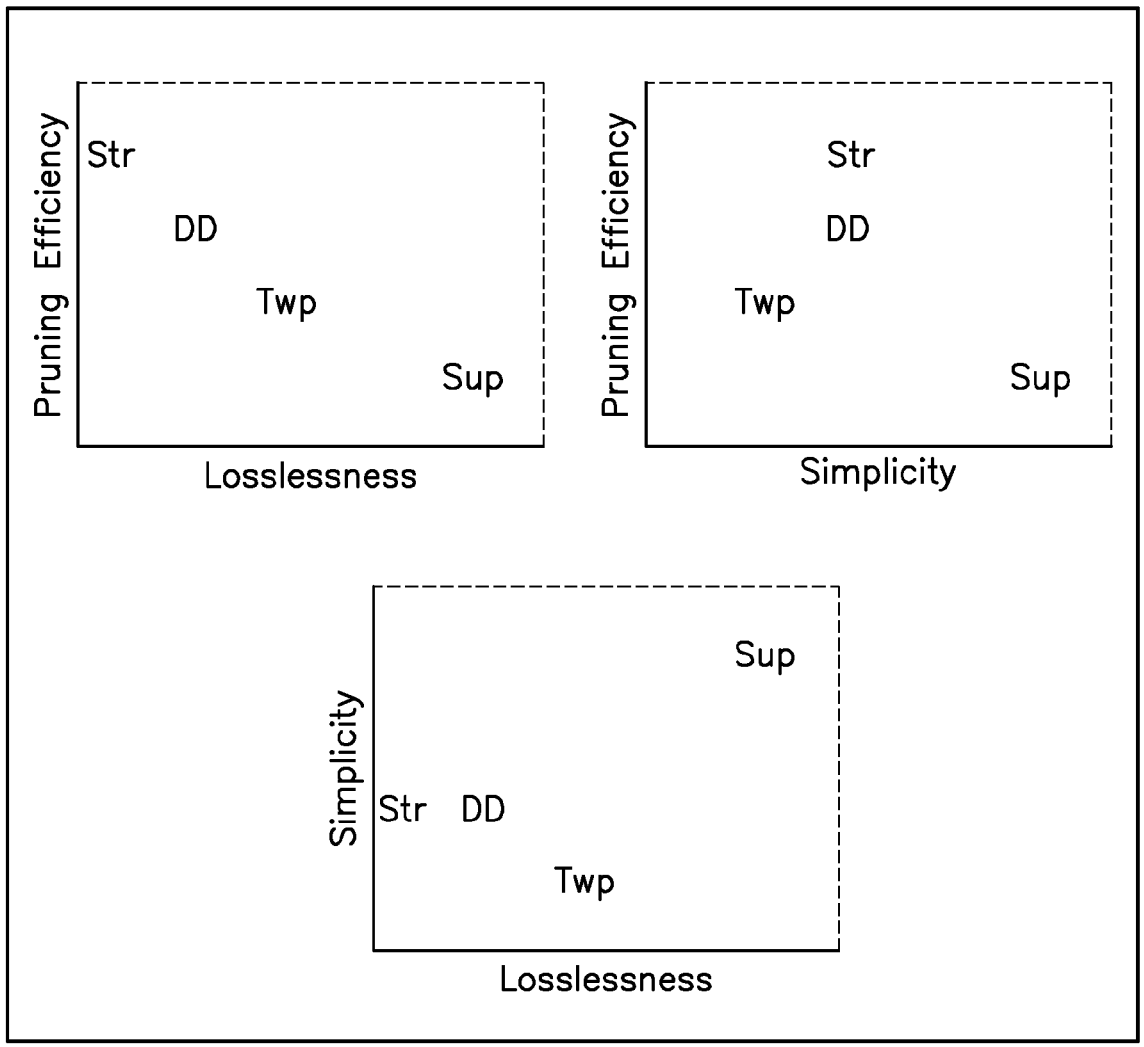
FIG. 16 is a series of example screen displays comparing various toleranced filters.

As described herein, the classical Pareto dominance filter may be modified to take into account model errors. An efficient filter discards as many candidates as possible from the original set so that the user contends with fewer alternatives in the Viewer. At the same time, it is desirable to maximize the likelihood that a candidate whose actual values would qualify it to be a survivor in fact survives. The toleranced filters described herein use some form of threshold in their comparisons of criterial values. Different filters may be used to meet the requirements of efficiency and low risk of losing good candidates. Referring to FIG. 16, a series of screen displays comparing various toleranced filters is shown. FIG. 16 shows how the filters might look in a Viewer when compared on three criteria. Simplicity is the opposite of computational cost. Lossiness is the risk of losing potentially good candidates. In FIG. 16, "str" refers to the strict filter, "DD" refers to the DD-dominance filter, "sup" refers to the superstrict filter, and "twp" refers to the two-pass filter.

Referring again to FIG. 1, using the Viewer 106, the user views a set of scatterplots or trade-off diagrams and makes choices in any of them, whose results are reflected in the other diagrams as well. The viewer enables narrowing of the subset of candidates. By a series of such choices in different diagrams, users typically narrow choices down to a much smaller fraction of the survivors that they start with. The user expresses preferences concretely by seeing what sorts of candidates are available and comparing their properties. There is a certain amount of contingency in which alternatives survive—a different order of looking at the diagrams may result in a somewhat different set of final survivors. However, in the HEV domain, engineers typically end up selecting essentially the same set even when they change the sequence of their intermediate decisions. This result occurs because, typically, the users do not simply select, but try to understand the consequences of their choices. When they make a selection in one scatterplot or trade-off diagram, the selection is immediately reflected in other scatterplots or trade-off diagrams. Then, they typically examine the survivors in the other diagrams to make sure the consequences make sense. If not, the viewer supports withdrawing the earlier selection and pursuing a different path. Thus, the best way to characterize user behavior is not simply one of making a sequence of choices, but also one of understanding the decision space from many different perspectives.

Figure 17:
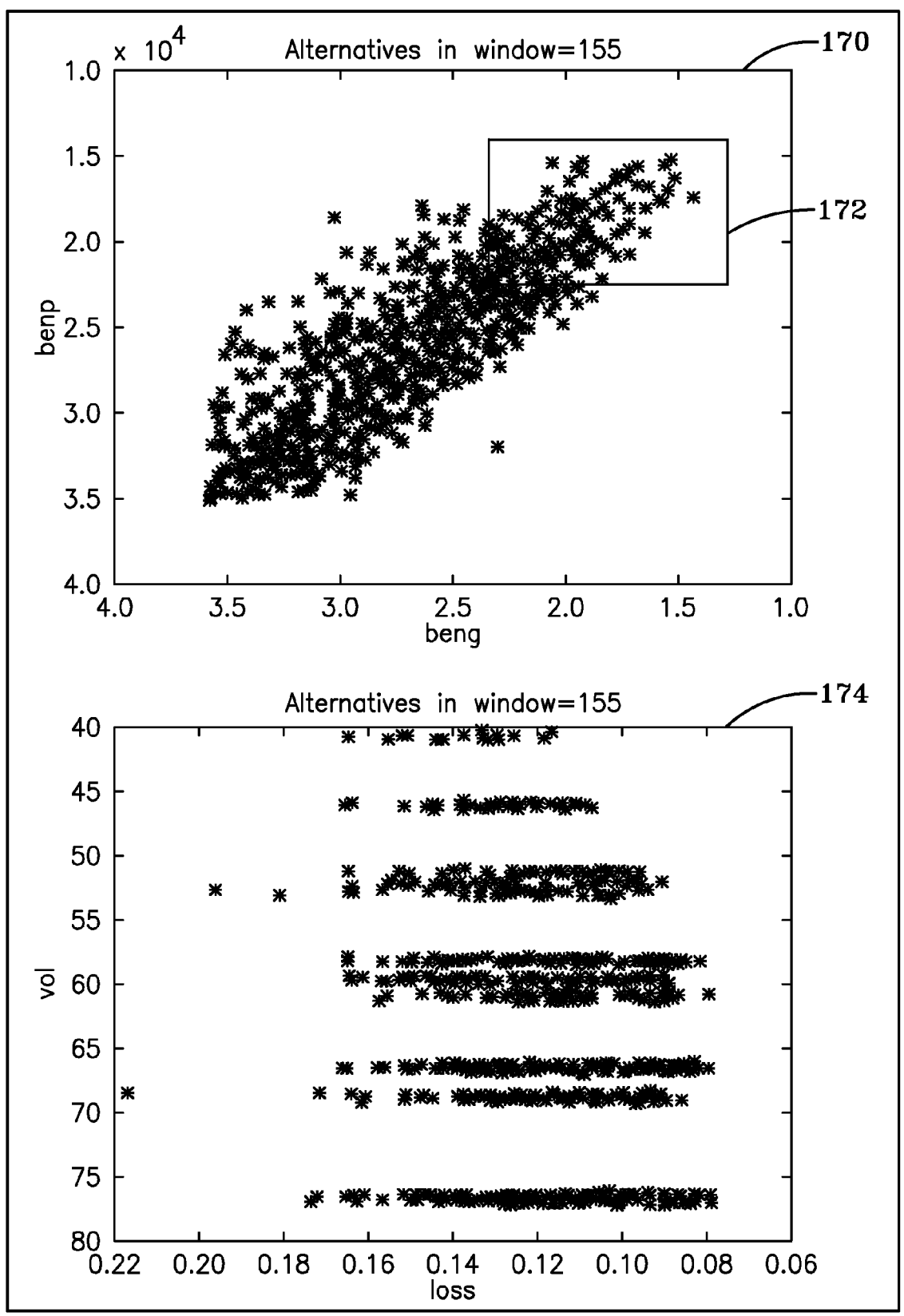
FIGS. 17 and 18 are example screen displays of scatterplots illustrating the display linking feature of the present invention.
Figure 18:
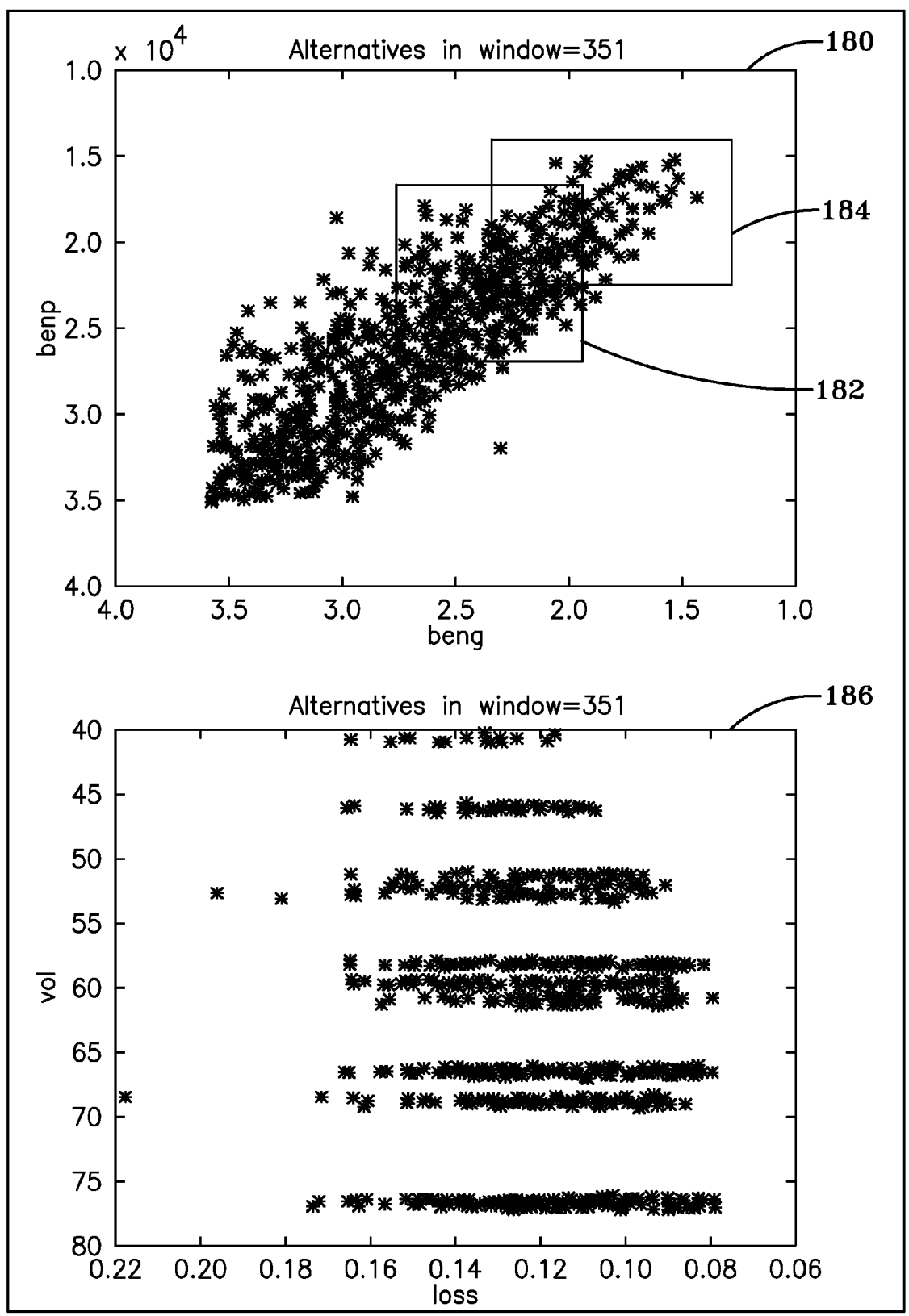

Referring to FIGS. 17 and 18, example screen displays of scatterplots illustrating the display linking feature of the present invention are shown. One feature of the Viewer is that the displays are linked. Selections made in one display are reflected in the others. Another feature of the viewer is the use of color to highlight the selected candidates. For example, in FIG. 17 left screen display 170, the user may tentatively select candidates within a rectangle 172. These choices may appear in red. The right display 174 shows the marked candidates in another scatterplot, displayed in the same color. The user may examine whether the selected candidates of the left display 170 have acceptable properties with respect to the criteria in the second plot 174 (and other plots not shown in the Figure). If not, the user may withdraw the tentative selection and make other selections. He may choose to make the selection smaller or larger, focus on other regions in the same scatterplot, or move to another scatterplot altogether.

The Viewer also supports viewing the intersection of different choices. For example, in FIG. 18, in the left screen display 180 the intersection of two selections 182, 184 is shown. The first selected region 182 may be in a first color and the second selected region 184 in a second color. The intersection may be shown in a third color. The colors will be retained in the other display 186 so the user can see how the candidates in the two sets and their intersection perform with respect to other criteria. The user may make a choice in one diagram, make a choice in another diagram, and then see whether the candidates satisfying both of the two choices have desirable properties in the other diagrams.

The Viewer is a tool by which to explore the trade-off relations among the candidates along the different performance criteria. The Viewer may also be used to make additional types of explorations. For example, one might wish to examine the relationship between a criterion of evaluation and a dimension of design specification. For example, one may wish to know, in the HEV domain, how fuel efficiency relates to the size of the motor, the latter being a design specification. If the design specification is qualitative, such as engine sizes being "small," "medium," or "large," a user may wish to know, for a set of candidates, the distribution of engine sizes among them. Histograms are a natural way of displaying this information.

Figure 19:
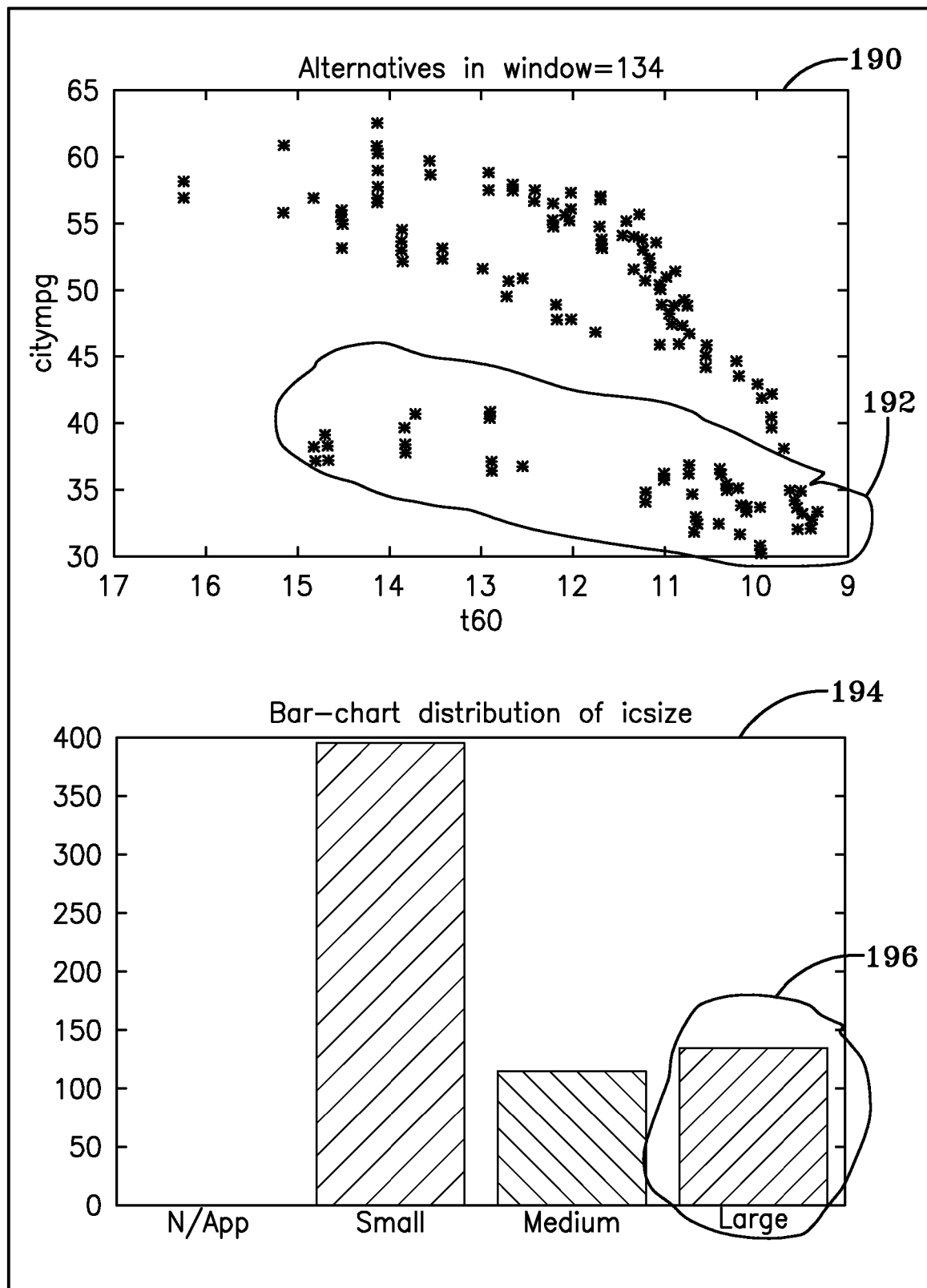
FIG. 19 is an example screen display illustrating the display linking feature of the present invention.

Referring to FIG. 19, an example screen display illustrating a display linking feature of the present invention is shown. FIG. 19 shows how histograms convey useful information about a set of candidates. In the left display 190, a user may select a set of candidates 192 that seem to form a cluster in a trade-off plot. He hypothesizes that engine size might account for the cluster. In the right display 192, a histogram of engine sizes confirms his hypothesis. The candidates in the selection 192 of left display 190, indeed, as shown in the right display 194, all have large engines 196.

As the number of criteria increases, the number of possible scatterplots grows as the second power of the number of criteria. In some domains, the user's domain knowledge may reduce the trade-off diagrams to be reviewed to a smaller number. Nevertheless, even this reduced number may be too large to be manageable. In order to help in such cases, the present invention provides a way for the user to look at the candidates along a number of dimensions in one display. The user may still successfully make choices with such a display of candidates using multiple criteria.

Figure 20A:
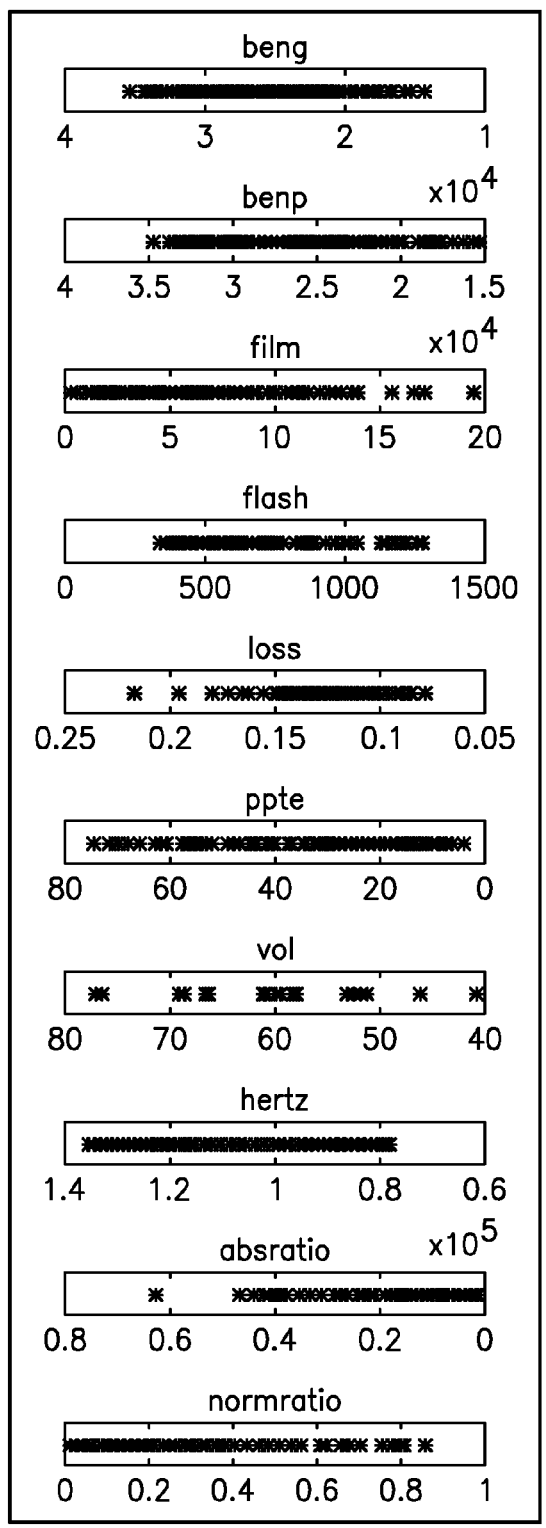
FIGS. 20A-20C are example screen displays illustrating the multi-attribute display feature of the present invention.
Figure 20B:
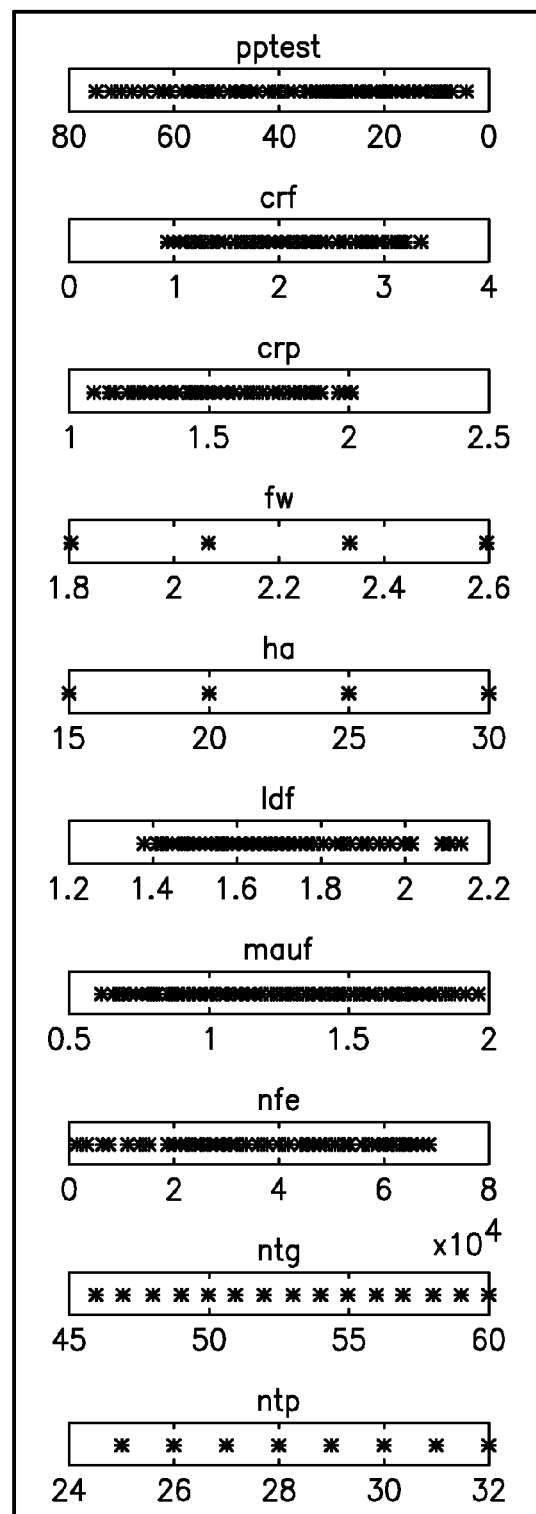
Figure 20C:
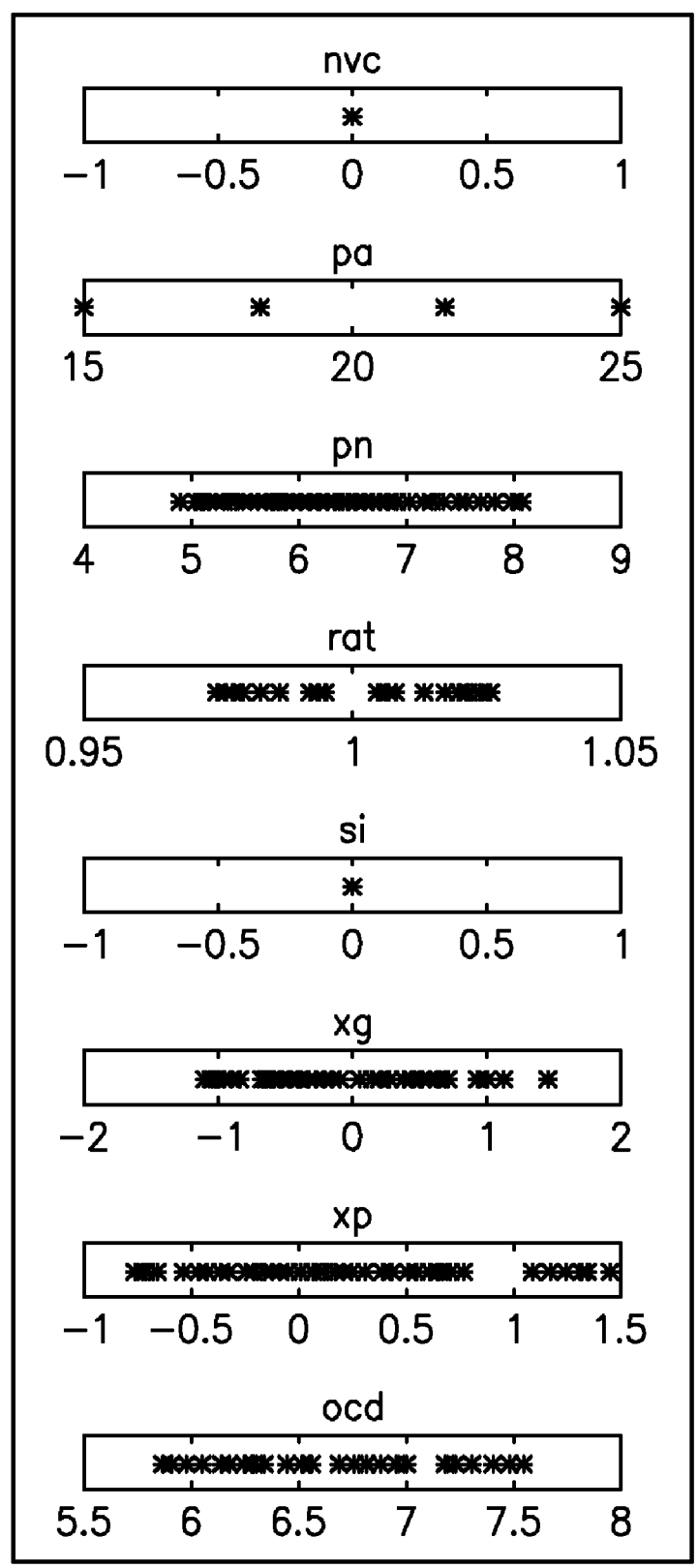

Referring to FIGS. 20A-20C, example screen displays illustrating the multi-attribute display feature of the present invention are shown. The example displays show the distribution of candidates, as one-dimensional scatterplots, according to 28 criteria that were used in the design of high-performance gear trains. The user may select candidates with respect to any one of the criteria and see instantly how they fare with respect to the other criteria. The user may perform intersections of different selections using different criteria. In comparison to two-dimensional scatterplots, there is some loss in the capability to directly observe trade-offs, but the ability to change the selection in one criterion and see how the values change along another criterion gives some ability to infer trade-off possibilities. This screen display may be combined with, and linked to, trade-off plots of selected criteria.

The architecture of the preset invention is not limited to uses for solving design problems. The architecture may be viewed as a general tool for human-in-the-loop multicriterial optimization. The Seeker may be viewed as an acquirer (generator or locator) of choice alternatives, whether the task be a design task, planning task, or, say, purchasing task. It is very common for humans to be in situations where there are many choice alternatives and multiple evaluation criteria apply. Unaided, the possibilities are often too many to think through. The architecture of the present invention helps significantly in many of these situations. In fact, in many problems, an elaborate or complex Seeker is not needed. The choice alternatives and their evaluations may already be available. For example, in purchasing tasks, a database of alternatives along with their costs and other attributes are often available.

One of the potential applications of the Seeker-Filter-Viewer architecture of the present invention is planning and scheduling. Plans and schedules are similar to designs. Elements of a plan or schedule are composed into a whole that satisfies constraints, achieves functions, and may be evaluated according to multiple criteria. Decision spaces for plans or schedules may be combinatorially large.

Another application of the Seeker-Filter-Viewer architecture is the manufacturing supply chain. Manufacturing typically involves acquiring components from one set of suppliers and sending finished products to another level in the supply chain. There is multicriterial decision making at both ends of this activity. Decisions are made about component properties and suppliers, and decisions are made about which purchaser or market offers the best combination of returns and constraints. Custom manufacturing is another potential application of the architecture. The consumer would use the decision architecture to decide which to order from a potentially large range of variations that may be manufactured.

Yet another application of the Seeker-Filter-Viewer architecture of the present invention is to find the best explanations in diagnosis, situation assessment, or similar problems. The problem of diagnosis and situation assessment may be formulated as the problem of finding a best explanation for a set of observations, which in turn can often be viewed as selecting from a set of plausible hypotheses. There are several criteria along which to judge the goodness of alternative hypotheses.

Diagnosis and situation assessment are instances of tasks that have been called abductive inference tasks. The solution often involves composing a number of alternative hypotheses that explain the data and choosing one that offers the best explanation. There is, however, no single notion of "best." Some of the criteria along with hypotheses can be evaluated are:

plausibility (some hypotheses are intrinsically more likely than others);

explanatory power (some hypotheses explain certain observations better than other hypotheses because they explain more of the observations);

simplicity (other things being equal, simpler explanations are better than complex explanations for the same set of data);

specificity (specific hypotheses—e.g., the patient has cirrhosis—are preferred over general hypotheses—e.g., that the patient has liver disease, thought both might be "correct");

consistency (components of the hypotheses should not contradict each other); and predictive power (some hypotheses may be used to suggest additional observations while others may not).

The present invention may be used to develop an explanation system for a problem in the domain of medicine. For example, the problem may be one of hypothesizing which antibodies might be present in a patient's blood, based on the results of a battery of tests. Different antibody hypotheses explain different test results to different degrees of reliability and plausibility. Thus, a hypothesis that explains all the data will typically be a composite of a number of component hypotheses.

Figure 21:
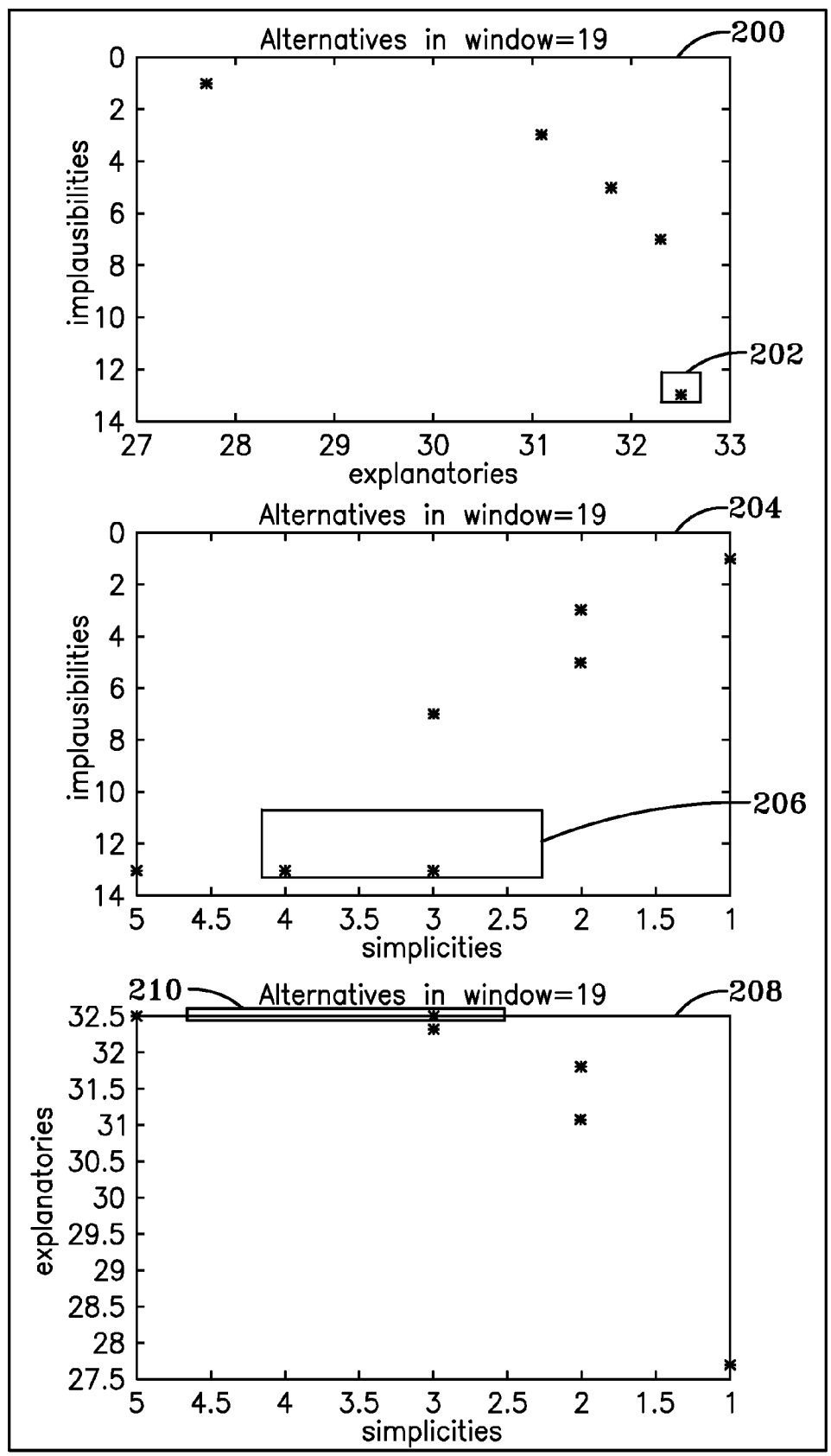
FIG. 21 is a series of example screen displays with scatterplots illustrating alternative explanations for an explanatory hypothesis experiment.

Referring to FIG. 21, a series of screen displays with scatterplots illustrating alternative explanations for an example antibody identification problem are shown. In theory, 65,535 composite hypotheses may be constructed that explain the data to different degrees of goodness. Each hypothesis may be rated along three criteria: implausibility, simplicity, and explanatory power. When dominance filtering was applied using these three criteria, only 19 hypotheses survived dominance. The survivors may be viewed in the scatterplots. In this experiment, the 19 survivors of dominance may be viewed in three scatterplots: explanatory power vs. implausibility (left display 200), simplicity vs. implausibility (middle display 204), and simplicity vs. explanatory power (right display 208). The user sees in the left display 200 that there is one candidate 202 that stands out as having the most explanatory power and the least implausibility. If the user selects it, the selection is highlighted by means of rectangles (as well as in color) in the two other diagrams 206, 210. The selection is not the highest scorer in simplicity, but it has acceptable simplicity values. In the right display 208, the selections 210 are at the high end of the explanatory power axis.

Finally, the Seeker-Filter-Viewer architecture of the present invention may be used for personal decision-making. Purchasing big-ticket items, such as computers, cars or refrigerators, and other decisions such as choosing a college or selecting an apartment are also examples of multi-criterial decision-making problems to which the architecture may be applied.

In ordering computers from the web sites of some computer manufacturers, the buyer may choose parameters of various components—the speed and type of the chip, the amount of RAM, the video memory, etc., to define a specific combination, and to get a price quote instantly. A user may be concerned not only with cost, but also with how well a PC functions for web browsing, office productivity, and game capability. Heuristic formulae may be developed that map from component parameter values to numbers that represent the three criteria values. Thus, each combination may be assessed for four criteria, the fourth criterion being cost.

Figure 22:
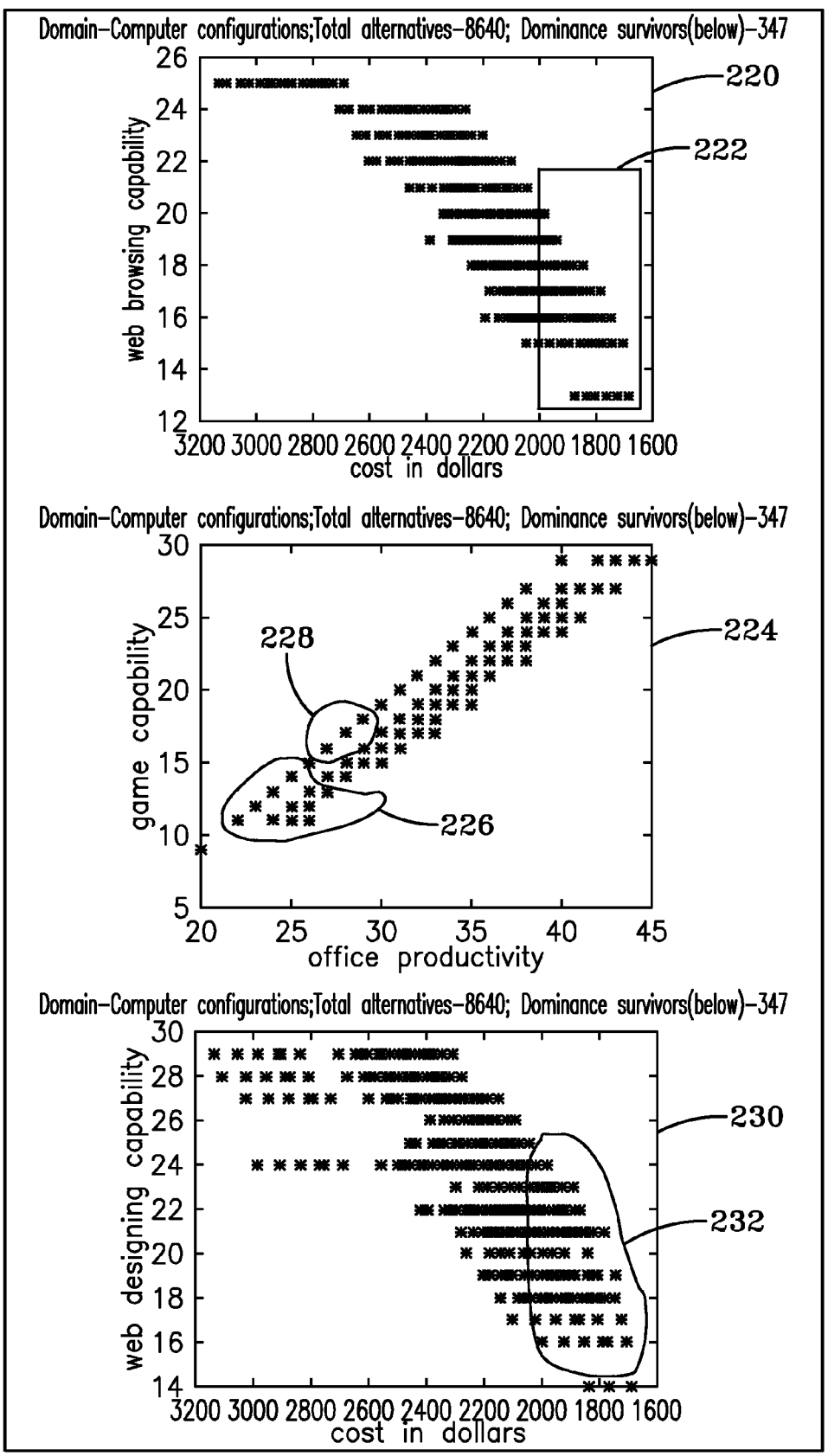
FIG. 22 is a series of example screen displays with scatterplots illustrating alternatives for a computer purchase experiment.

In one such experiment, the number of total alternatives was 8,640, and the dominance filter narrowed them down to 347 choices. Referring to FIG. 22, a series of screen displays with scatterplots for a computer purchase experiment is shown. The user chooses a subset 222 from the left display 220 based on cost and acceptability for web browsing, and sees how the chosen alternatives measure up in the office productivity and game capability dimensions. The circled regions 226, 228 of the middle display 224 and the circled region 232 of the right display 230 illustrate that several computers have values in the middle range in the two criteria.

FIG. 22 shows how the alternatives look in the viewer. A user viewing the diagram may hope for "sweet spots" in the displays—places where small changes in one criterion correspond to large changes in some of the other criteria. The lack of "sweet spots" may be an artifact of the computer manufacturer's pricing policy. Nevertheless, the user is still able to bring his relative preferences to the fore and make satisfactory choices.

Figure 23:
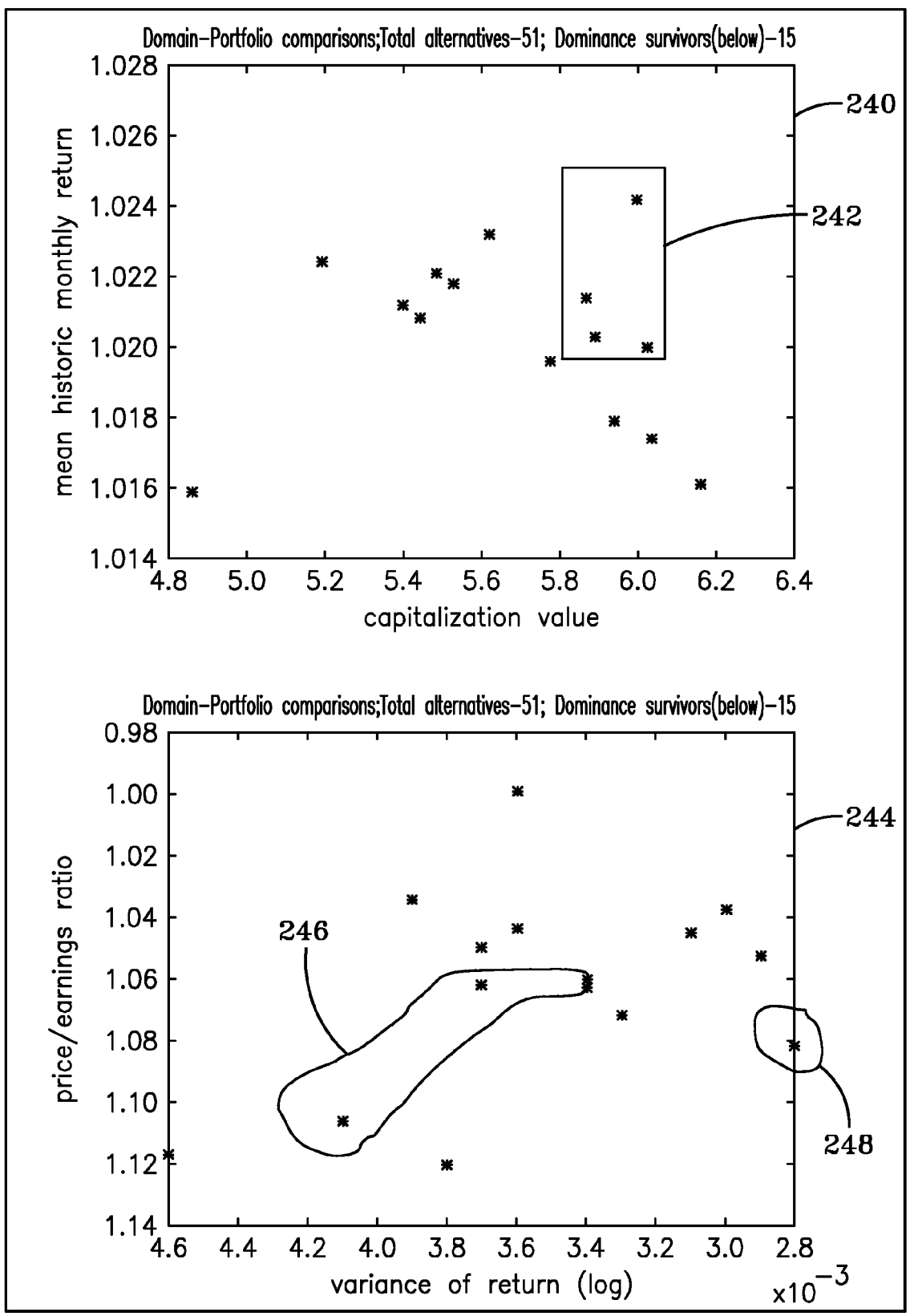
FIG. 23 is a series of example screen displays with scatterplots illustrating alternatives for a portfolio selection experiment.

The architecture of the present invention may be applied to a problem that is often used in the academic literature to validate multicriterial optimization proposals—choosing an investment portfolio. In a portfolio choice experiment, 51 portfolios, evaluated along four criteria—capitalization-value, mean-historic-monthly return, variance-of-return and price-earnings-ratio—were filtered using dominance, and 15 survived. Referring to FIG. 23, a series of screen displays with scatterplots illustrating alternatives for the portfolio experiment is shown. The left display 240 shows the surviving portfolios (15 out of 51 original) in the trade-off diagram, capitalization-value against mean-historic-monthly return, while the right display 244 shows the same survivors in the trade-off diagram, variance-of-return against price-earnings-ratio. The user selects a subset 242 in the left display 240 that score well in both criteria. The circled region 248 of the right display 244 shows a candidate that has the lowest variance and has a PE ratio in the middle range. A user might see that that candidate has a substantially better variance value while being only marginally worse than the best candidates in the other circled region 246.

The present invention takes advantage of computational power, something that is relatively cheap and getting cheaper. Therefore, explicitly considering large numbers of alternatives is achievable. In the design of such complex engineering systems such as automobiles and space stations, the availability of computing power reduces the need to economize at the stage of conceptual design. In the conceptual design phase, users need the assurance that as many alternatives as possible, even those that appear unlikely a priori to be winners, have been looked at, so there is low risk that good possibilities have been overlooked. Even when the underlying space of alternatives can be viewed as continuous, the approach of the present invention organizes the space appropriately and converts the problem into one of choosing from a large (and extensible) set of discrete alternatives.

The present invention makes it possible to move away from incremental improvements in developing new designs. The present invention supports practical exploration of large design spaces, both because computational costs are relatively low in comparison to the potential for identifying good design possibilities in normally overlooked regions of the design space, and also because the combination of the filter and the viewer make selecting interesting candidates from the large space very practical.

A major benefit of the architecture is the understanding of the choice space that users get as a result of viewing, and interactively selecting, the candidates in the Viewer. A user commonly wants to know what makes certain candidates have the values they have in certain dimensions. As a result, the user identifies the design specifications of the candidates of interest. In many cases, users express surprise, but after additional investigations, conclude that the values are reasonable after all. In some situations, users do not have any familiarity with certain regions of the space, because the combinations that the region represents are not typically considered. Thus, the actual performance of the candidates in that region is a source of initial surprise, followed by additional analysis, followed by greater understanding of that region of the decision space.

While particular embodiments of the invention have been illustrated and described, various modifications and combinations can be made without departing from the spirit and scope of the invention, and all such modifications, combinations, and equivalents are intended to be covered and claimed.

What is claimed is:

1. A computerized system for exploring a set of decision alternatives $D_1$-$D_n$ wherein each of said decision alternatives in said set is evaluated according to at least two criteria $C_1$ and $C_2$, said system comprising:
   (a) a first software component that produces a subset from said set of decision alternatives $D_1$-$D_n$ using a multi-criterial filter and values for said at least two criteria $C_1$ and $C_2$ wherein said multi-criterial filter produces said subset by:
      (i) comparing decision alternatives in said set of decision alternatives $D_1$-$D_n$ according to said values for said at least two criteria $C_1$ and $C_2$;

(ii) removing from said set of decision alternatives $D_1$-$D_n$ decisions alternatives that are inferior according to said values for said at least two criteria $C_1$ and $C_2$ wherein inferiority is determined according to whether larger values for $C_i$ or smaller values for $C_i$ are preferred; and (iii) retaining in said set of decision alternatives $D_1$-$D_n$ only decisions alternatives that are not inferior to any other decision alternatives according to said values for said at least two criteria $C_1$ and $C_2$ wherein superiority is determined according to whether larger values for $C_i$ or smaller values for $C_i$ are preferred; and (b) a second software component that presents on a computer display said subset of said set of decision alternatives $D_1$-$D_n$ produced by said multi-criterial filter of said first software component, wherein additional decision alternatives in said subset of said set of decision alternatives $D_1$-$D_n$ are removed from said subset of decision alternatives, forming a favored sub-subset of decision alternatives, in consideration of specific values of said decision alternatives according to computed criteria applied to decision alternatives in said subset of decision alternatives, including said at least two criteria $C_1$ and $C_2$ used in filtering said decision alternatives $D_1$-$D_n$.

2. The computerized system of claim 1 further comprising a third software component for obtaining said set of decision alternatives from a database.

3. The computerized system of claim 1 further comprising a third software component that uses a functional and compositional modeling language for producing said set of decision alternatives and for evaluating said decision alternatives according to two or more criteria by simulations of behaviors of said decision alternatives.

4. The computerized system of claim 1 wherein said multi-criterial filter of said first software component is selected from the group consisting of classical filters, toleranced filters, strict filters, superstrict filters, selective superstrict filters, discernable difference toleranced filters, two pass toleranced filters, and onionskin filters.

5. The computerized system of claim 1 wherein said second software component displays said subset of said set of decision alternatives $D_1$-$D_n$ in scatterplots with axes corresponding to said at least two criteria $C_1$ and $C_2$ such that decision alternatives selected within a first scatterplot are distinguished from other decision alternatives in at least one other display of said decision alternatives.

6. The computerized system of claim 1 wherein said second software component presents said subset of said set of decision alternatives produced by said multi-criterial filter in a multi-attribute display comprising a one-dimensional scatterplot for each of said at least two criteria $C_1$ and $C_2$.

7. A computerized method for exploring a set of evaluated decision alternatives $D_1$-$D_n$ wherein each of said decision alternatives in said set is evaluated according to at least two criteria $C_1$ and $C_2$, said method comprising:

(a) producing a subset from said set of decision alternatives $D_1$-$D_n$ by applying a multi-criterial filter to said set of decision alternatives using values for said at least two criteria $C_1$ and $C_2$ wherein said multi-criterial filter produces said subset by:

(i) comparing said values for said at least two criteria $C_1$ and $C_2$ for two decision alternatives $D_a$ and $D_b$;

(ii) removing $D_b$ from said set of decision alternatives $D_1$-$D_n$ based on application of a dominance relation $\epsilon$ to said values for said at least two criteria $C_1$ and $C_2$; and (iii) repeating steps (i) and (ii) for said set of decision alternatives $D_1$-$D_n$ until no additional decision alternatives are removed by application of steps (i) and (ii); and (b) displaying on a computer graphical representations of said decision alternatives in said subset of decision alternatives according to said at least two criteria $C_1$ and $C_2$.

8. The computerized method of claim 7 wherein said dominance relation is a classical dominance relation, $\epsilon$ is zero, and $D_b$ is removed if $C_1(D_a)$ is superior or equal to $C_1(D_b)$ and $C_2(D_a)$ is superior or equal to $C_2(D_b)$, wherein superiority for each criterion is determined according to whether larger values for C or smaller values for C are preferred.

9. The computerized method of claim 7 wherein said dominance relation is a toleranced dominance relation, $\epsilon$ has a non-zero value, and $D_b$ is removed if $C_1(D_a)$ is superior to $C_1(D_b)$ by at least $\epsilon$, wherein superiority for each criterion is determined according to whether larger values for C or smaller values for C are preferred.

10. The computerized method of claim 7 wherein said dominance relation is a strict dominance relation, $\epsilon$ has a non-zero value, and $D_b$ is removed if $C_1(D_a)$ is superior to $C_1(D_b)$ by more than $\epsilon$, wherein superiority for each criterion is determined according to whether larger values for C or smaller values for C are preferred.

11. The computerized method of claim 7 wherein said dominance relation is a super strict dominance relation, $\epsilon$ has a non-zero value, and $D_b$ is removed if $C_1(D_a)$ is superior to $C_1(D_b)$ by more than $\epsilon$ and if $C_2(D_a)$ is superior to $C_2(D_b)$ by more than $\epsilon$, wherein superiority for each criterion is determined according to whether larger values for C or smaller values for C are preferred.

12. The computerized method of claim 7 wherein said dominance relation is a selective super strict dominance relation, $\epsilon$ has a non-zero value, and $D_b$ is removed if $C_1(D_a)$ is superior to $C_1(D_b)$ by more than $\epsilon$ and if $C_2(D_a)$ is not $\epsilon$-worse than $C_2(D_b)$, wherein superiority for each criterion is determined according to whether larger values for C or smaller values for C are preferred.

13. The computerized method of claim 7 wherein displaying on a computer graphical representations of said decision alternatives in said subset of decision alternatives according to said at least two criteria $C_1$ and $C_2$ comprises creating a scatterplot wherein said axes of said scatterplot correspond to said at least two criteria $C_1$ and $C_2$.

14. A computerized method for exploring decision alternatives, comprising:

(a) producing a set of evaluated decision alternatives $D_1$-$D_n$ by:

(i) acquiring a plurality of decision alternatives; and (ii) evaluating each of said plurality of decision alternatives according to a plurality of criteria $C_1$-$C_m$ to produce said set of evaluated decision alternatives $D_1$-$D_n$; and;

(b) producing a subset from said set of evaluated decision alternatives $D_1$-$D_n$ by applying a multi-criterial filter to values for said plurality of criteria $C_1$-$C_m$ wherein said multi-criterial filter produces said subset by:

(i) comparing said values for said plurality of criteria $C_1$-$C_m$ for two decision alternatives $D_a$ and $D_b$;

(ii) removing $D_b$ from said set of decision alternatives $D_1$-$D_n$ based on application of a dominance relation $\epsilon$ to said values for said said plurality of criteria $C_1$-$C_m$; and (iii) repeating steps (i) and (ii) for said set of evaluated decision alternatives $D_1$-$D_n$ until no additional evaluated decision alternatives are removed by application of steps (i) and (ii) and remaining evaluated decision alternatives are trade-offs with respect to each other; and (c) presenting on a computer display graphical representations of said evaluated decision alternatives $D_1$-$D_n$ wherein each evaluated decision alternative on said computer display is from said subset of evaluated decision alternatives containing only evaluated decision alternatives that are trade-offs with respect to each other.

15. The computerized method of claim 14 wherein said dominance relation is a classical dominance relation, $\epsilon$ is zero, $D_b$ is removed if $C_i(D_a)$ is superior or equal to $C_i(D_b)$ for every criterion $C_i$ in $C_1$-$C_m$, wherein superiority for each criterion is determined according to whether larger values for C or smaller values for C are preferred.

16. The computerized method of claim 14 wherein said dominance relation is a toleranced dominance relation, $\epsilon$ has a non-zero value, and $D_b$ is removed if $C_i(D_a)$ is superior to $C_i(D_b)$ by at least $\epsilon$ for every criterion $C_i$ in $C_1$-$C_m$, wherein superiority for each criterion C in $C_1$-$C_m$ is determined according to whether larger values for C or smaller values for C are preferred.

17. The computerized method of claim 14 wherein said dominance relation is a strict dominance relation, $\epsilon$ has a non-zero value, and $D_b$ is removed if $C_i(D_a)$ is superior to $C_i(D_b)$ by more than $\epsilon$ for at least one criterion $C_i$ in $C_1$-$C_m$, wherein superiority for a criterion C in $C_1$-$C_m$ is determined according to whether larger values for C or smaller values for C are preferred.

18. The computerized method of claim 14 wherein said dominance relation is a super strict dominance relation, $\epsilon$ has a non-zero value, and $D_b$ is removed if $C_i(D_a)$ is superior to $C_i(D_b)$ by more than $\epsilon$ for every criterion $C_i$ in $C_1$-$C_m$, wherein superiority for each criterion C in $C_1$-$C_m$ is determined according to whether larger values for C or smaller values for C are preferred.

19. The computerized method of claim 7 wherein repeating steps (i) and (ii) for said set of decision alternatives $D_1$-$D_n$ until no additional decision alternatives are removed by application of steps (i) and (ii) further comprises changing tolerances $\epsilon$ in determining superiority on subsequent applications of steps (ii).

20. The computerized method of claim 14 wherein presenting on a computer display graphical representations of said subset of evaluated decision alternatives $D_1$-$D_n$ comprises presenting said subset of evaluated decision alternatives in scatterplots wherein axes of said scatterplots correspond to said criteria $C_1$-$C_m$.

* * * * *